United States Patent
Holmgren et al.

(10) Patent No.: US 11,429,230 B2
(45) Date of Patent: Aug. 30, 2022

(54) MOTORIST USER INTERFACE SENSOR

(71) Applicant: Neonode Inc., San Jose, CA (US)

(72) Inventors: Stefan Johannes Holmgren, Sollentuna (SE); Lars Bertil Sparf, Vällingby (SE); Tom Richard Berglind, Älvsjö (SE); Charles Bruce Banter, Northville, MI (US); Per Carl Johan Nohlert, Västeras (SE)

(73) Assignee: Neonode Inc, San Jose, CA (US)

( * ) Notice: Subject to any disclaimer, the term of this patent is extended or adjusted under 35 U.S.C. 154(b) by 0 days.

(21) Appl. No.: 17/296,252

(22) PCT Filed: Nov. 25, 2019

(86) PCT No.: PCT/US2019/062909
§ 371 (c)(1),
(2) Date: May 23, 2021

(87) PCT Pub. No.: WO2020/112585
PCT Pub. Date: Jun. 4, 2020

(65) Prior Publication Data
US 2022/0035477 A1    Feb. 3, 2022

Related U.S. Application Data

(60) Provisional application No. 62/778,390, filed on Dec. 12, 2018, provisional application No. 62/772,574, filed on Nov. 28, 2018.

(51) Int. Cl.
*G06F 3/042* (2006.01)
*B60K 35/00* (2006.01)
*G06F 3/0488* (2022.01)

(52) U.S. Cl.
CPC ............ *G06F 3/0421* (2013.01); *B60K 35/00* (2013.01); *G06F 3/0488* (2013.01);
(Continued)

(58) Field of Classification Search
CPC ..... G06F 3/0421; G06F 3/0488; B60K 35/00; B60K 2370/782; B60K 2370/1468; B60K 2370/23
See application file for complete search history.

(56) References Cited

U.S. PATENT DOCUMENTS 4,243,879 A    1/1981   Carroll et al.
4,267,443 A    5/1981   Carroll et al.
(Continued)

FOREIGN PATENT DOCUMENTS

DE         4423744 A1    4/1995
DE      202014104143 U   10/2014
(Continued)

OTHER PUBLICATIONS

Pfleging, B., Schneegass, S., Schmidt, A., Multimodal Interaction in the Car—Combining Speech and Gestures on the Steering Wheel, Proceedings of the 4th International Conference on Automotive User Interfaces and Interactive Vehicular Applications (AutomotiveUI '12), Oct. 17-19, 2012, Portsmouth, NH, USA.
(Continued)

*Primary Examiner* — Afroza Chowdhury
(74) *Attorney, Agent, or Firm* — Soquel Group LLC

(57) ABSTRACT

A steering wheel that includes optoelectronic components, each specific optoelectronic component including a light projector projecting light out of the steering wheel at two different angles, denoted a1 and a2, a light sensor detecting reflections of the light projected by neighboring optoelectronic components by an object above the steering wheel, a lens oriented relative to the light sensor such that the light sensor receives maximum intensity when light enters the lens at either of two particular angles, specifically, when light enters the lens at a particular angle b1, and at a particular angle b2 different than b1, wherein angle b1 views reflections of light projected at angle a1 by the optoelec-
(Continued)

tronic component neighboring the specific optoelectronic component on one side, and angle b2 views reflections of light projected at angle a2 by the optoelectronic component neighboring the specific optoelectronic component on the side opposite the one side.

16 Claims, 21 Drawing Sheets

(52) U.S. Cl.
CPC .. *B60K 2370/1468* (2019.05); *B60K 2370/23* (2019.05); *B60K 2370/782* (2019.05)

(56) References Cited

U.S. PATENT DOCUMENTS

| | | |
|---|---|---|
| 4,301,447 A | 11/1981 | Funk et al. |
| 4,518,249 A | 5/1985 | Murata et al. |
| 4,550,250 A | 10/1985 | Mueller et al. |
| 4,703,316 A | 10/1987 | Sherbeck |
| 4,710,760 A | 12/1987 | Kasday |
| 4,782,328 A | 11/1988 | Denlinger |
| 4,790,028 A | 12/1988 | Ramage |
| 4,847,606 A | 7/1989 | Beiswenger |
| 4,880,969 A | 11/1989 | Lawrie |
| 4,928,094 A | 5/1990 | Smith |
| 5,003,505 A | 3/1991 | McClelland |
| 5,016,008 A | 5/1991 | Gruaz |
| 5,036,187 A | 7/1991 | Yoshida et al. |
| 5,053,758 A | 10/1991 | Cornett et al. |
| 5,103,085 A | 4/1992 | Zimmerman |
| 5,119,079 A | 6/1992 | Hube et al. |
| 5,162,783 A | 11/1992 | Moreno |
| 5,179,369 A | 1/1993 | Person et al. |
| 5,194,863 A | 3/1993 | Barker et al. |
| 5,220,409 A | 6/1993 | Bures |
| 5,283,558 A | 2/1994 | Chan |
| 5,406,307 A | 4/1995 | Hirayama et al. |
| 5,414,413 A | 5/1995 | Tamaru et al. |
| 5,422,494 A | 6/1995 | West |
| 5,463,725 A | 10/1995 | Henckel et al. |
| 5,559,727 A | 9/1996 | Deley et al. |
| 5,577,733 A | 11/1996 | Downing |
| 5,579,035 A | 11/1996 | Beiswenger |
| 5,603,053 A | 2/1997 | Gough et al. |
| 5,612,719 A | 3/1997 | Beemink et al. |
| 5,618,232 A | 4/1997 | Martin |
| 5,729,250 A | 3/1998 | Bishop et al. |
| 5,748,185 A | 5/1998 | Stephan et al. |
| 5,785,439 A | 7/1998 | Bowen |
| 5,825,352 A | 10/1998 | Bisset et al. |
| 5,838,308 A | 11/1998 | Knapp et al. |
| 5,880,743 A | 3/1999 | Moran et al. |
| 5,886,697 A | 3/1999 | Naughton et al. |
| 5,889,236 A | 3/1999 | Gillespie et al. |
| 5,900,875 A | 5/1999 | Haitani et al. |
| 5,914,709 A | 6/1999 | Graham et al. |
| 5,936,615 A | 8/1999 | Waters |
| 5,943,043 A | 8/1999 | Furuhata et al. |
| 5,943,044 A | 8/1999 | Martinelli et al. |
| 5,956,030 A | 9/1999 | Conrad et al. |
| 5,988,645 A | 11/1999 | Downing |
| 6,010,061 A | 1/2000 | Howell |
| 6,023,265 A | 2/2000 | Lee |
| 6,031,989 A | 2/2000 | Cordell |
| 6,052,279 A | 4/2000 | Friend et al. |
| 6,073,036 A | 6/2000 | Heikkinen et al. |
| 6,085,204 A | 7/2000 | Chijiwa et al. |
| 6,091,405 A | 7/2000 | Lowe et al. |
| 6,114,949 A | 9/2000 | Schmitz et al. |
| 6,135,494 A | 10/2000 | Lotito et al. |
| 6,246,395 B1 | 6/2001 | Goyins et al. |
| 6,259,436 B1 | 7/2001 | Moon et al. |
| 6,292,179 B1 | 9/2001 | Lee |
| 6,310,609 B1 | 10/2001 | Morgenthaler |
| 6,323,846 B1 | 11/2001 | Westerman et al. |
| 6,340,979 B1 | 1/2002 | Beaton et al. |
| 6,346,935 B1 | 2/2002 | Nakajima et al. |
| 6,356,287 B1 | 3/2002 | Ruberry et al. |
| 6,359,632 B1 | 3/2002 | Eastty et al. |
| 6,362,468 B1 | 3/2002 | Murakami et al. |
| 6,411,283 B1 | 6/2002 | Murphy |
| 6,421,042 B1 | 7/2002 | Omura et al. |
| 6,429,857 B1 | 8/2002 | Masters et al. |
| 6,456,952 B1 | 9/2002 | Nathan |
| 6,529,920 B1 | 3/2003 | Arons et al. |
| 6,542,191 B1 | 4/2003 | Yonezawa |
| 6,549,217 B1 | 4/2003 | De Greef et al. |
| 6,570,557 B1 | 5/2003 | Westerman et al. |
| 6,597,345 B2 | 7/2003 | Hirshberg |
| 6,628,268 B1 | 9/2003 | Harada et al. |
| 6,639,584 B1 | 10/2003 | Li |
| 6,646,633 B1 | 11/2003 | Nicolas |
| 6,677,932 B1 | 1/2004 | Westerman |
| 6,690,365 B2 | 2/2004 | Hinckley et al. |
| 6,690,387 B2 | 2/2004 | Zimmerman et al. |
| 6,703,999 B1 | 3/2004 | Iwanami et al. |
| 6,707,449 B2 | 3/2004 | Hinckley et al. |
| 6,727,917 B1 | 4/2004 | Chew et al. |
| 6,734,883 B1 | 5/2004 | Wynn et al. |
| 6,757,002 B1 | 6/2004 | Oross et al. |
| 6,788,292 B1 | 9/2004 | Nako et al. |
| 6,803,906 B1 | 10/2004 | Morrison et al. |
| 6,833,827 B2 | 12/2004 | Lui et al. |
| 6,836,367 B2 | 12/2004 | Seino et al. |
| 6,857,746 B2 | 2/2005 | Dyner |
| 6,864,882 B2 | 3/2005 | Newton |
| 6,874,683 B2 | 4/2005 | Keronen et al. |
| 6,888,536 B2 | 5/2005 | Westerman et al. |
| 6,944,557 B2 | 9/2005 | Hama et al. |
| 6,947,032 B2 | 9/2005 | Morrison et al. |
| 6,954,197 B2 | 10/2005 | Morrison et al. |
| 6,958,749 B1 | 10/2005 | Matsushita et al. |
| 6,972,401 B2 | 12/2005 | Akitt et al. |
| 6,988,246 B2 | 1/2006 | Kopitzke et al. |
| 6,992,660 B2 | 1/2006 | Kawano et al. |
| 7,006,077 B1 | 2/2006 | Uusimaki |
| 7,007,239 B1 | 2/2006 | Hawkins et al. |
| 7,030,861 B1 | 4/2006 | Westerman et al. |
| 7,046,232 B2 | 5/2006 | Inagaki et al. |
| 7,126,583 B1 | 10/2006 | Breed |
| 7,133,032 B2 | 11/2006 | Cok |
| 7,155,683 B1 | 12/2006 | Williams |
| 7,159,763 B2 | 1/2007 | Yap et al. |
| 7,176,905 B2 | 2/2007 | Baharav et al. |
| 7,184,030 B2 | 2/2007 | McCharles et al. |
| 7,221,462 B2 | 5/2007 | Cavallucci |
| 7,225,408 B2 | 5/2007 | ORourke |
| 7,232,986 B2 | 6/2007 | Worthington et al. |
| 7,254,775 B2 | 8/2007 | Geaghan et al. |
| 7,265,748 B2 | 9/2007 | Ryynanen |
| 7,283,845 B2 | 10/2007 | De Bast |
| 7,286,063 B2 | 10/2007 | Gauthey et al. |
| 7,339,580 B2 | 3/2008 | Westerman et al. |
| 7,352,940 B2 | 4/2008 | Charters et al. |
| 7,355,594 B2 | 4/2008 | Barkan |
| 7,369,724 B2 | 5/2008 | Deane |
| 7,372,456 B2 | 5/2008 | McLintock |
| 7,429,706 B2 | 9/2008 | Ho |
| 7,435,940 B2 | 10/2008 | Eliasson et al. |
| 7,441,196 B2 | 10/2008 | Gottfurcht et al. |
| 7,441,800 B2 | 10/2008 | Weber et al. |
| 7,442,914 B2 | 10/2008 | Eliasson et al. |
| 7,464,110 B2 | 12/2008 | Pyhalammi et al. |
| 7,465,914 B2 | 12/2008 | Eliasson et al. |
| 7,469,381 B2 | 12/2008 | Ording |
| 7,474,772 B2 | 1/2009 | Russo et al. |
| 7,479,949 B2 | 1/2009 | Jobs et al. |
| 7,518,738 B2 | 4/2009 | Cavallucci et al. |
| 7,587,072 B2 | 9/2009 | Russo et al. |
| 7,633,300 B2 | 12/2009 | Keroe et al. |
| 7,663,607 B2 | 2/2010 | Hotelling et al. |
| 7,705,835 B2 | 4/2010 | Eikman |

(56) References Cited

U.S. PATENT DOCUMENTS

| | | |
|---|---|---|
| 7,742,290 B1 | 6/2010 | Kaya |
| 7,782,296 B2 | 8/2010 | Kong et al. |
| 7,812,828 B2 | 10/2010 | Westerman et al. |
| 7,855,716 B2 | 12/2010 | McCreary et al. |
| 7,880,724 B2 | 2/2011 | Nguyen et al. |
| 7,880,732 B2 | 2/2011 | Goertz |
| 8,022,941 B2 | 9/2011 | Smoot |
| 8,026,798 B2 | 9/2011 | Makinen et al. |
| 8,068,101 B2 | 11/2011 | Goertz |
| 8,089,299 B1 | 1/2012 | Rahman et al. |
| 8,095,879 B2 | 1/2012 | Goertz |
| 8,120,625 B2 | 2/2012 | Hinckley |
| 8,193,498 B2 | 6/2012 | Cavallucci et al. |
| 8,289,299 B2 | 10/2012 | Newton |
| 8,564,424 B2 | 10/2013 | Evarts et al. |
| 8,775,023 B2 | 7/2014 | Frojdh et al. |
| 8,918,252 B2 | 12/2014 | Frojdh et al. |
| 8,933,876 B2 | 1/2015 | Galor et al. |
| 9,092,093 B2 | 7/2015 | Jubner et al. |
| 9,770,986 B2 | 9/2017 | Sannomiya et al. |
| 2001/0043189 A1 | 11/2001 | Brisebois et al. |
| 2002/0152010 A1 | 10/2002 | Colmenarez et al. |
| 2002/0158453 A1 | 10/2002 | Levine |
| 2003/0086588 A1 | 5/2003 | Shinada |
| 2004/0044293 A1 | 3/2004 | Burton |
| 2004/0199309 A1 | 10/2004 | Hayashi et al. |
| 2005/0021190 A1 | 1/2005 | Worrell et al. |
| 2005/0052426 A1 | 3/2005 | Hagermoser et al. |
| 2006/0047386 A1 | 3/2006 | Kanevsky et al. |
| 2008/0211779 A1 | 9/2008 | Pryor |
| 2009/0139778 A1 | 6/2009 | Butler et al. |
| 2009/0166098 A1 | 7/2009 | Sunder |
| 2009/0278915 A1 | 11/2009 | Kramer et al. |
| 2009/0322673 A1 | 12/2009 | Cherradi El Fadili |
| 2010/0185341 A1 | 7/2010 | Wilson et al. |
| 2011/0030502 A1 | 2/2011 | Lathrop |
| 2011/0032214 A1 | 2/2011 | Gruhlke et al. |
| 2011/0050589 A1 | 3/2011 | Yan et al. |
| 2011/0087963 A1 | 4/2011 | Brisebois et al. |
| 2011/0241850 A1 | 10/2011 | Bosch et al. |
| 2011/0310005 A1 | 12/2011 | Chen et al. |
| 2012/0109455 A1 | 5/2012 | Newman et al. |
| 2012/0179328 A1 | 7/2012 | Goldman-Shenhar |
| 2012/0232751 A1 | 9/2012 | Guspan |
| 2012/0283894 A1 | 11/2012 | Naboulsi |
| 2012/0326735 A1 | 12/2012 | Bennett et al. |
| 2013/0024071 A1 | 1/2013 | Sivertsen |
| 2013/0063336 A1 | 3/2013 | Sugimoto et al. |
| 2013/0204457 A1 | 8/2013 | King et al. |
| 2014/0081521 A1 | 3/2014 | Frojdh et al. |
| 2014/0292665 A1 | 10/2014 | Lathrop et al. |
| 2015/0100204 A1 | 4/2015 | Gondo |
| 2015/0123947 A1 | 5/2015 | Jubner et al. |
| 2016/0154475 A1* | 6/2016 | Eriksson ............... G06F 3/042 345/156 |
| 2017/0262134 A1 | 9/2017 | Eriksson et al. |
| 2018/0105185 A1 | 4/2018 | Watanabe et al. |
| 2018/0296915 A1 | 10/2018 | Holmgren et al. |

FOREIGN PATENT DOCUMENTS

| | | |
|---|---|---|
| EP | 0330767 A1 | 9/1989 |
| EP | 0513694 A2 | 11/1992 |
| EP | 0601651 A1 | 6/1994 |
| EP | 0618528 A1 | 10/1994 |
| EP | 0703525 A1 | 3/1996 |
| EP | 1059603 A2 | 12/2000 |
| EP | 2937263 A2 | 10/2015 |
| GB | 1107666 A | 3/1968 |
| GB | 2319997 A | 6/1998 |
| GB | 2423808 A | 9/2006 |
| JP | 03-216719 A | 9/1991 |
| JP | 5-173699 A | 7/1993 |
| JP | 6-39621 U | 5/1994 |
| JP | 10-148640 A | 6/1998 |
| JP | 10-269012 A | 10/1998 |
| JP | 11-232024 A | 8/1999 |
| JP | 2001-216069 A | 8/2001 |
| JP | 3240941 B2 | 12/2001 |
| JP | 2009-248629 A | 10/2009 |
| JP | 2010-088487 A | 4/2010 |
| JP | 2011-254957 A | 12/2011 |
| JP | 2012-181639 A | 9/2012 |
| JP | 2014-225145 A | 12/2014 |
| WO | 86/00446 A1 | 1/1986 |
| WO | 86/00447 A1 | 1/1986 |
| WO | 96/15464 A1 | 5/1996 |
| WO | 01/02949 A1 | 1/2001 |
| WO | 01/40922 A2 | 6/2001 |
| WO | 02/095668 A1 | 11/2002 |
| WO | 03/038592 A1 | 5/2003 |
| WO | 03/083767 A2 | 10/2003 |
| WO | 2005/026938 A2 | 3/2005 |
| WO | 2008/147266 A1 | 12/2008 |
| WO | 2009/008786 A1 | 1/2009 |
| WO | 2010/093570 A1 | 8/2010 |
| WO | 2010/121031 A1 | 10/2010 |
| WO | 2011/119483 A1 | 9/2011 |

OTHER PUBLICATIONS

Pfeiffer, M., Döring, T., Kern, D Krüger, A., Schöning, J., Schmidt, A., A Multi-Touch Enabled Steering Wheel—Exploring the Design Space, CHI 2010, Apr. 10-15, 2010, Atlanta, Georgia, USA.

Mahr, A., Endres, C., Schneeberger, T., Müller, C., Determining Human-Centered Parameters of Ergonomic Micro-Gesture Interaction for Drivers Using the Theater Approach, AutomotiveUI 2011, Nov. 30-Dec. 2, 2011, Salzburg, Austria.

Döring, T., Kern, D., Marshall, P., Pfeiffer, M., Schöning, J., Gruhn, V., Schmidt, A., Gestural Interaction on the Steering Wheel—Reducing the Visual Demand, CHI 2011, May 7-12, 2011, Vancouver, BC, Canada.

Navarro, J., Mars, F., Hoc, J.-M., Lateral Control Support for Car Drivers: a Human-Machine Cooperation Approach, Proceedings of the ECCE 2007 Conference, Aug. 28-31, 2007, London, UK.

Angelini, L., et al., Gesturing on the Steering Wheel: a User-elicited taxonomy, AutomotiveUI '14, Sep. 17-19, 2014, Seattle, WA, USA.

Werner, Steffen, The Steering Wheel as a Touch Interface: Using Thumb-Based Gesture Interfaces as Control Inputs While Driving, AutomotiveUI '14, Sep. 17-19, 2014, Seattle, WA, USA.

González, I. E., et al., Eyes on the Road, Hands on the Wheel: Thumb-based Interaction Techniques for Input on Steering Wheels, Graphics Interface Conference 2007, May 28-30, 2007, Montreal, Canada.

Murer, M., et al., Exploring the Back of the Steering Wheel: Text Input with Hands on the Wheel and Eyes on the Road, AutomotiveUI'12, Oct. 17-19, Portsmouth, NH, USA.

Koyama, S., et al., Multi-Touch Steering Wheelfor In-Car Tertiary Applications Using Infrared Sensors, AH '14, Mar. 7-9, 2014, Kobe, Japan.

Non-Final Office action received for U.S. Appl. No. 14/088,458 dated Feb. 7, 2014, 8 pages.

Notice of Allowance for U.S. Appl. No. 14/088,458 dated Mar. 6, 2014, 8 pages.

Search Report and Written Opinion for PCT application No. PCT/US13/71557 dated Apr. 25, 2014, 25 pages.

Examination Report No. 1 received for Australian patent application No. 2013352456 dated Dec. 23, 2014, 9 pages.

First Office Action received for Chinese patent application No. 201380021907.X dated Mar. 28, 2016, 12 pages.

Search Report for European patent application No. 13 859 391.8 dated Mar. 18, 2016, 8 pages.

Search Report for European patent application No. 17 184 782.5 dated Jul. 9, 2018, 10 pages.

Office Action from the Japanese Patent Office re: JP Patent Application: No. 2015-530174, dated Aug. 6, 2015, 7 pages.

First Office action for Korean patent application No. 10-2015-7001419 dated May 20, 2015, 3 pages.

(56) References Cited

OTHER PUBLICATIONS

Non-Final Office action received for U.S. Appl. No. 14/312,787 dated Jan. 8, 2015, 15 pages.
European Patent Application No. 19 890 109.2, European Search Report, dated Nov. 22, 2021,. 5 pages.
PCT/US2019/062909, International Search Report and Written Opinion, dated Mar. 24, 2020, 10 pp.

* cited by examiner

MOTORIST USER INTERFACE SENSOR

FIELD OF THE INVENTION

The field of the present invention is user interfaces for motorists and passengers, via the steering wheel and overhead console in a vehicle.

BACKGROUND OF THE INVENTION

Prior art user interfaces on steering wheels associate a function with an absolute position on the steering wheel. This is conceptually analogous to a touch-sensitive screen displaying icons where the user touches the location on the screen at which the icon is located to activate the icon.

Reference is made to FIG. 1, which is a simplified illustration of a prior art steering wheel. FIG. 1 shows a steering wheel 400, including a circular grip 401, also known as a ring member, one or more connecting members 402-404 that connect grip 401 to steering column 407, and buttons 405 and 406 on connecting members 402 and 403; namely, button 405 is used to answer an incoming phone call on the vehicle's speaker phone, and button 406 hangs up the call.

In contrast to user interfaces based on absolute positioning, the computer mouse introduced a user interface for controlling a cursor based on relative positioning. Namely, the mouse cursor moves on the screen in a direction that the mouse moves from point A to point B, but this movement is not at all contingent on the actual coordinates—the absolute positions—of points A and B. This shift from absolute positioning to relative positioning frees the user from having to look at, or be aware of, the location of the mouse on the table. The user only has to control the direction in which the mouse moves on the table, which he can do without looking at the mouse. One of the objectives of the present invention is to provide a user interface that does not require a driver to take his eyes off the road.

Overhead consoles have multiple functions that are located in a confined space. The functions need to be easily identified by the user and intuitive in operation to keep the driver's attention on the road and must comply with federal regulations specifying design, construction, performance and durability requirements for motor vehicles and regulated components, systems and design features. In the United States these regulations are contained in the Federal Motor Vehicle Safety Standards (FMVSS), in Canada in the Canada Motor Vehicle Safety Standards (CMVSS), and other countries have adopted UN regulations developed by the World Forum for Harmonization of Vehicle Regulations. FMVSS No. 118 regulating window, partition and roof panel systems, aims at preventing accidental operation, e.g., by a child, leg or knee. Thus, for example, roof panel switches that can close a roof panel by momentary switch actuation must be protected from operation by a 20 mm radius sphere which represents a knee or leg.

Reference is made to FIG. 2, which is an image of a prior art vehicle overhead console. FIG. 2 shows an overhead console 600 having map light 601, roof panel control 602 and slide switch 603 for controlling the vehicle's internal cabin light.

SUMMARY

The present disclosure relates to user interfaces for on-board vehicle systems, and teaches a user interface that does not require the user to look at the steering wheel in order to activate a function. The present disclosure teaches user gestures that can be mapped to a variety of applications.

There is thus provided in accordance with an embodiment of the present invention a steering wheel including a series of optoelectronic components mounted in the steering wheel grip, each specific optoelectronic component including a PCB, a light projector, having at least one light pulse emitter, mounted on the PCB, the light projector projecting light out of the steering wheel grip at two different angles, denoted a1 and a2, a light sensor, having at least one light detector mounted on the PCB, the light sensor detecting reflections of the light projected by the light pulse emitters of the optoelectronic components that neighbor the specific optoelectronic component on two opposite sides thereof, the light being reflected by an object above the steering wheel grip, a lens oriented relative to the light sensor in such a manner that the light sensor receives maximum intensity when light enters the lens at either of two particular angles, specifically, (i) the light sensor receives maximum intensity when the light reflected by the object enters the lens at a particular angle b1, and (ii) the light sensor also receives maximum intensity when light reflected by the object enters the lens at a particular angle b2 different than b1, wherein angle b1 views reflections of light projected at angle a1 by the light projector of the optoelectronic component neighboring the specific optoelectronic component on one side, and angle b2 views reflections of light projected at angle a2 by the light projector of the optoelectronic component neighboring the specific optoelectronic component on the side opposite the one side.

There is additionally provided, in accordance with an embodiment of the present invention, a steering wheel including a series of optoelectronic components mounted in the steering wheel grip, each specific optoelectronic component including a PCB, at least two light pulse emitters mounted on the PCB for projecting light out of the steering wheel grip, at least two light detectors mounted on the PCB detecting reflections of the light projected by light pulse emitters of optoelectronic components on opposite sides of the specific optoelectronic component, the light being reflected by an object above the steering wheel grip, and a lens oriented relative to the light detectors in such a manner that each light detector receives maximum intensity when light enters the lens at a particular angle, specifically, (i) one or more of the light pulse emitters project light out of the steering wheel grip at an angle a1, (ii) one or more others of the light pulse emitters project light out of the steering wheel grip at an angle a2 different than a1, (iii) one or more of the light detectors receive maximum intensity when the light reflected by the object enters the lens at a particular angle b1, and (iv) one or more others of the light detectors receive maximum intensity when light reflected by the object enters the lens at a particular angle b2 different than b1.

There is further provided, in accordance with an embodiment of the present invention, a method for detecting driver input by providing a series of optoelectronic components in a steering wheel grip, each specific optoelectronic component projecting light beams in two emission directions, denoted by angles a1 and a2, out of the steering wheel grip, and orienting a lens within each specific optoelectronic component so as to provide two viewing angles, denoted b1 and b2, that detect maximum intensity of reflections of the light projected by optoelectronic components that neighbor the specific optoelectronic component, the light being reflected by a reflective object above the steering wheel grip, wherein viewing angle b1 receives maximum intensity when light projected by a first neighboring optoelectronic component at angle a1 is reflected by the object, and viewing angle b2 receives maximum intensity when light projected by a second neighboring optoelectronic component at angle a2 is reflected by the object.

The present disclosure also relates to controls mounted in overhead consoles in vehicles. The user interface described hereinbelow can be applied to additional areas in and around the vehicle, in addition to the overhead console.

There is thus provided in accordance with an embodiment of the present invention a vehicle overhead console including a touch sensitive surface, a gesture sensor operable to identify in-air wave gestures performed in an airspace opposite the surface, a processor, connected to the surface and the sensor, controlling a plurality of a vehicle systems in response to a plurality of respective, multi-gesture operations, each multi-gesture operation including a touch gesture on the surface indicating a corresponding one of the vehicle systems, and an in-air wave gesture in the airspace opposite the surface indicating a function to be performed by the indicated vehicle system.

There is additionally provided, in accordance with an embodiment of the present invention, a method for controlling vehicle systems, including providing a touchscreen display in the interior roof of a vehicle, rendering representations of a plurality of user controlled vehicle systems, providing a gesture sensor operable to detect in-air wave gestures in an airspace opposite the touchscreen display, and performing a vehicle system function in response to a multi-gesture operation including a touch gesture on one of the rendered representations followed by an in-air wave gesture in the airspace opposite the touchscreen display.

BRIEF DESCRIPTION OF THE DRAWINGS

The present invention will be more fully understood and appreciated from the following detailed description, taken in conjunction with the drawings in which.

In the disclosure and figures, the following numbering scheme is used. Like numbered elements are similar but not necessarily identical.

| Type of element | Numbering range |
|---|---|
| steering wheel | 100-104 |
| PCB | 105-109 |
| light emitter | 110-114 |
| light detector | 115-119 |
| lens or optical part | 120-129 |
| optoelectronic component | 150-159 |
| outgoing light beam | 160-169 |
| viewing angle | 170-179 |
| hotspot | 180-189 |
| hand | 190-199 |
| prior art elements | 400-410 |
| prior art vehicle overhead console | 600 |
| map light | 601 |
| roof panel control | 602 |
| cabin light slide switch | 603 |
| touchscreen display | 604 |
| map light icon | 605-607 |
| open/close sunroof icon | 608 |
| sunroof pop-up vent icon | 609 |
| open/close moonroof icon | 610 |
| finger | 611 |
| fingers | 612 |
| in-air detection plane | 613 |
| movement direction arrows | 614 |
| vehicle interior roof | 615 |
| rearview mirror | 616 |
| front windshield | 617 |

DETAILED DESCRIPTION

Aspects of the present disclosure relate to light-based touch and gesture controls that allow a driver to keep his hands on the steering wheel and eyes on the road while operating electronic devices and automated features in a vehicle. Detection of ergonomic gestures is enabled by the sensors described herein, and the invention includes methods of interacting with systems in the vehicle using the ergonomic gestures on the steering wheel.

Figure 1:
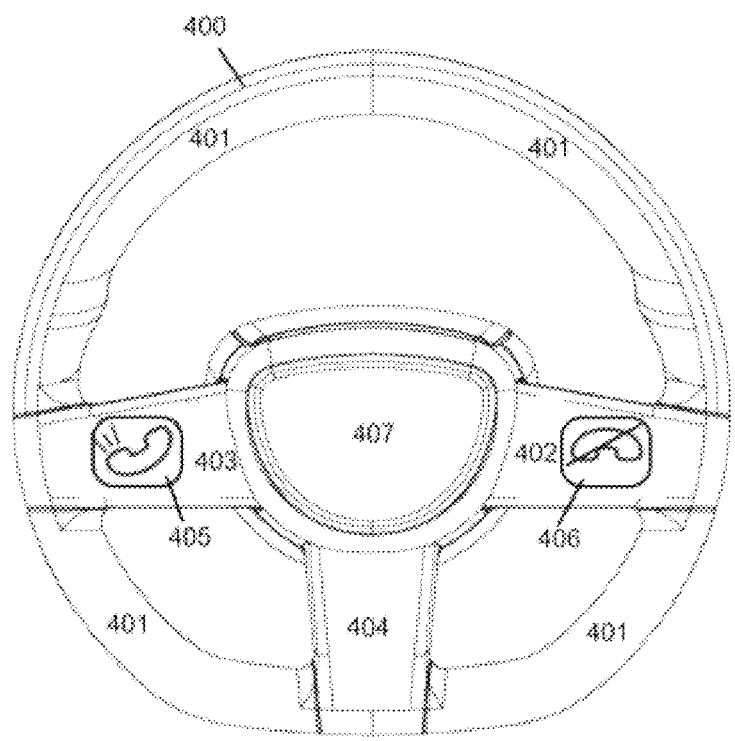
FIG. 1 is a simplified illustration of a prior art steering wheel.
Figure 2:
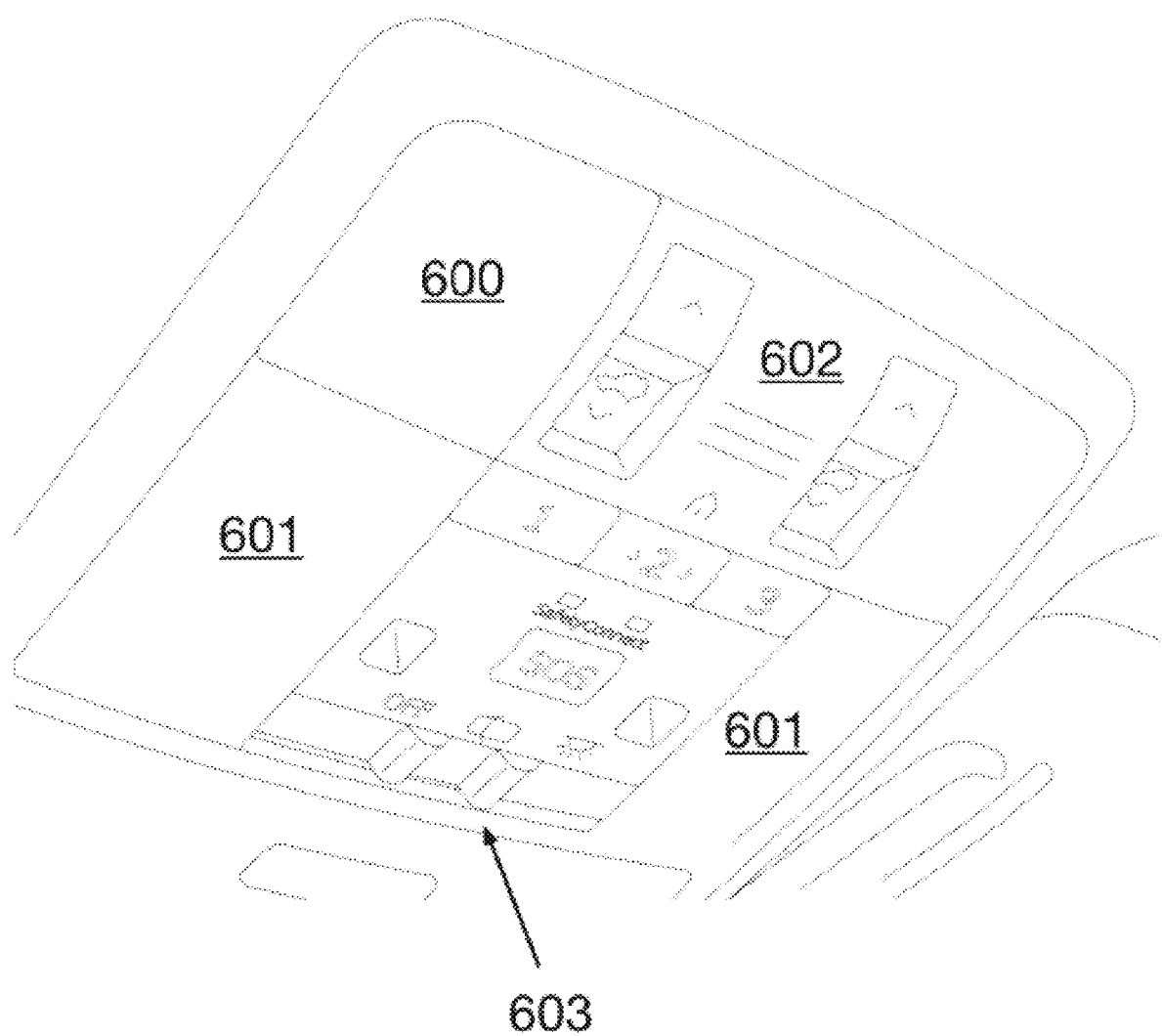
FIG. 2 is an image of a prior art vehicle overhead console.
Figure 3:
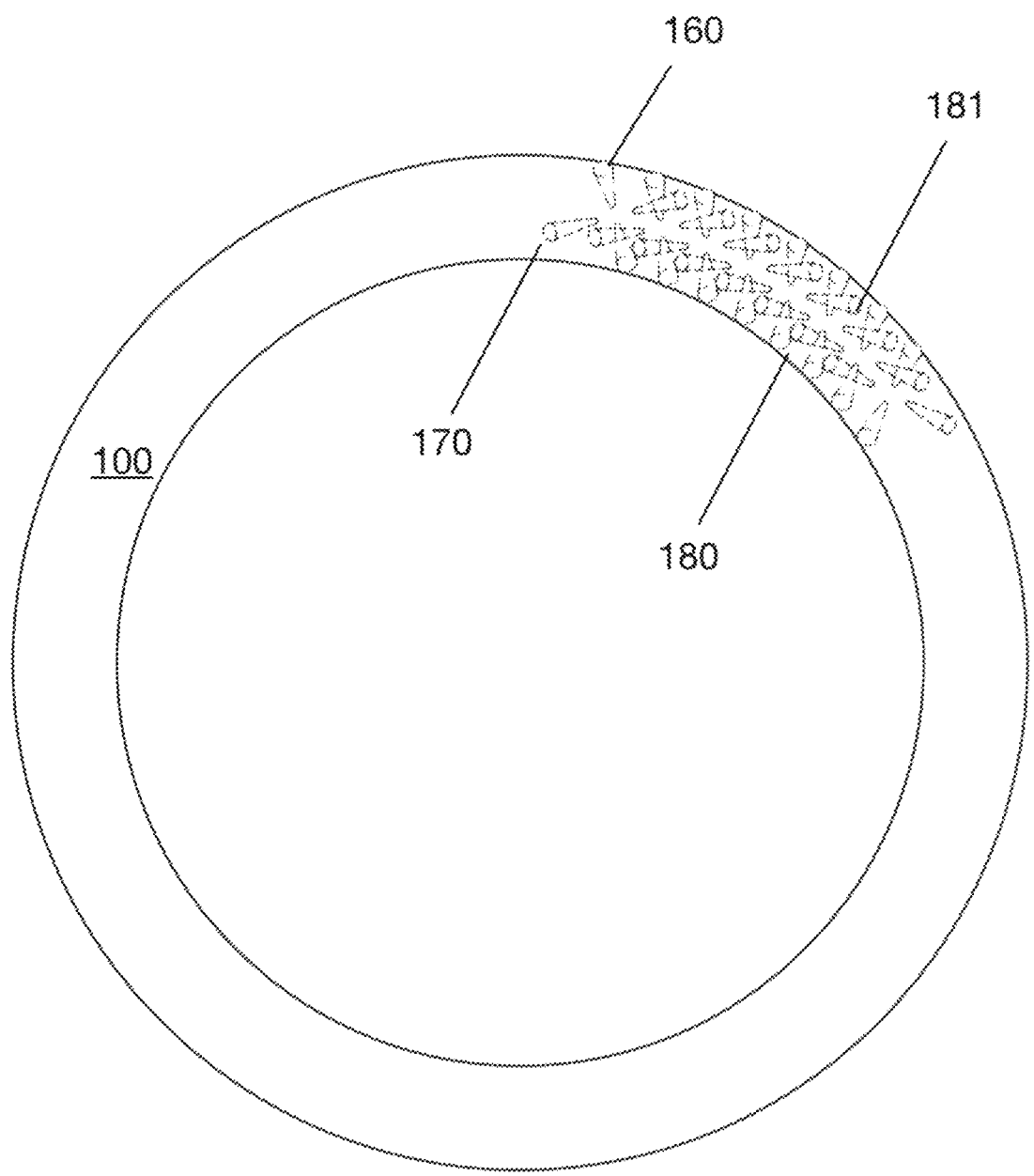
FIG. 3 is a simplified illustration of a steering wheel, in accordance with an embodiment of the present invention.

Reference is made to FIG. 3, which is a simplified illustration of a steering wheel, in accordance with an embodiment of the present invention. FIG. 3 shows steering wheel 100. The upper-right segment of the steering wheel ring member has two concentric bands of proximity sensors, 180 and 181. In FIG. 3 each proximity sensor has a light emitter (not shown) that emits a directed light beam 160 outwards from the steering wheel, and a light detector (not shown) having a specific viewing angle 170. In the figures, emitter beams and viewing angles are drawn using dashed lines. The emitter beams are drawn using longer dashes than the viewing angles. The proximity sensor light detector detects an object when light beam 160 is reflected back at the detector's specific viewing angle 170. FIG. 3 shows the intersection between each emitter beam 160 and a respective detector viewing angle 170. The intersection is the location at which an object will be maximally detected by the proximity sensor. The steering wheel's concentric bands of proximity sensors identify swipe gestures across the width of the steering wheel grip. Viewing angle 170 is also referred to as a corridor of maximum detection.

Figure 4:
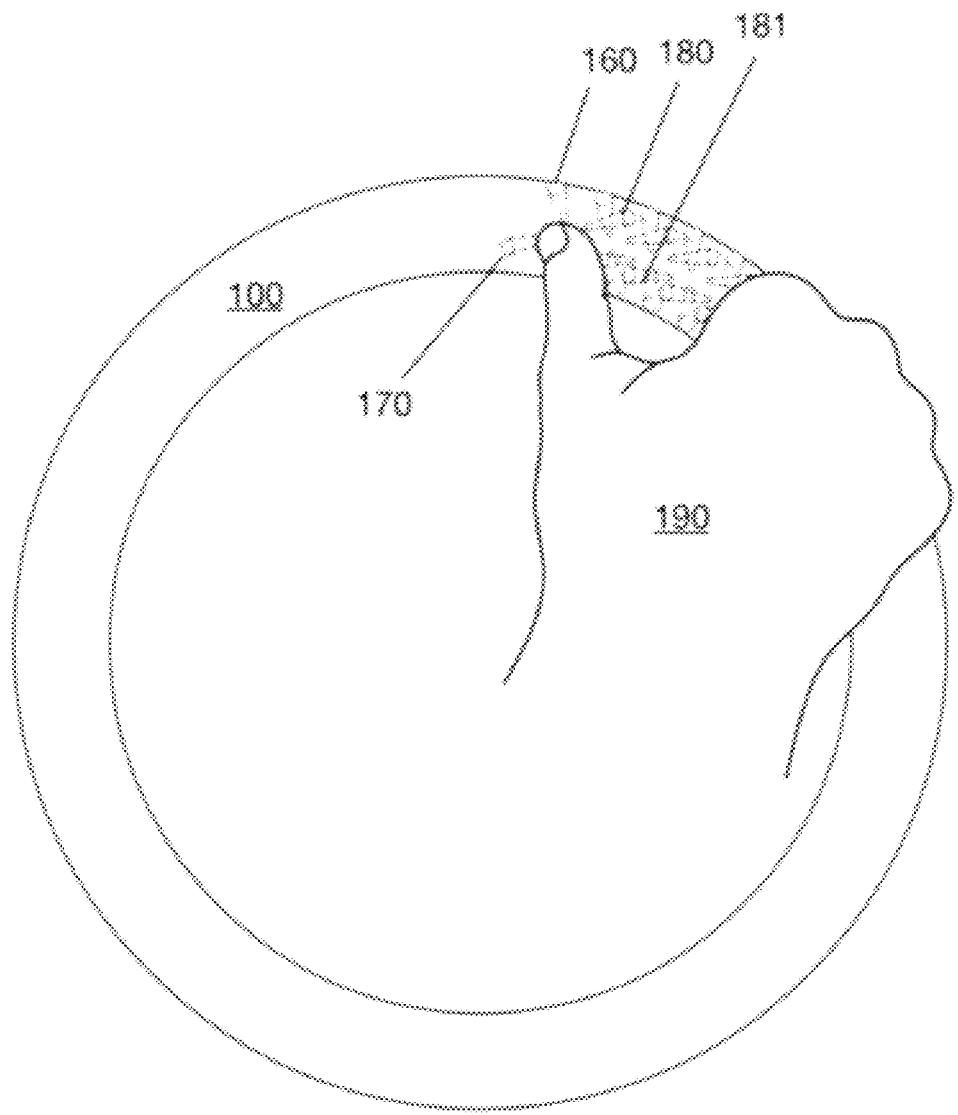
FIGS. 4 and 5 are simplified illustrations of a thumb swipe gesture detected by a steering wheel, in accordance with an embodiment of the present invention.
Figure 5:
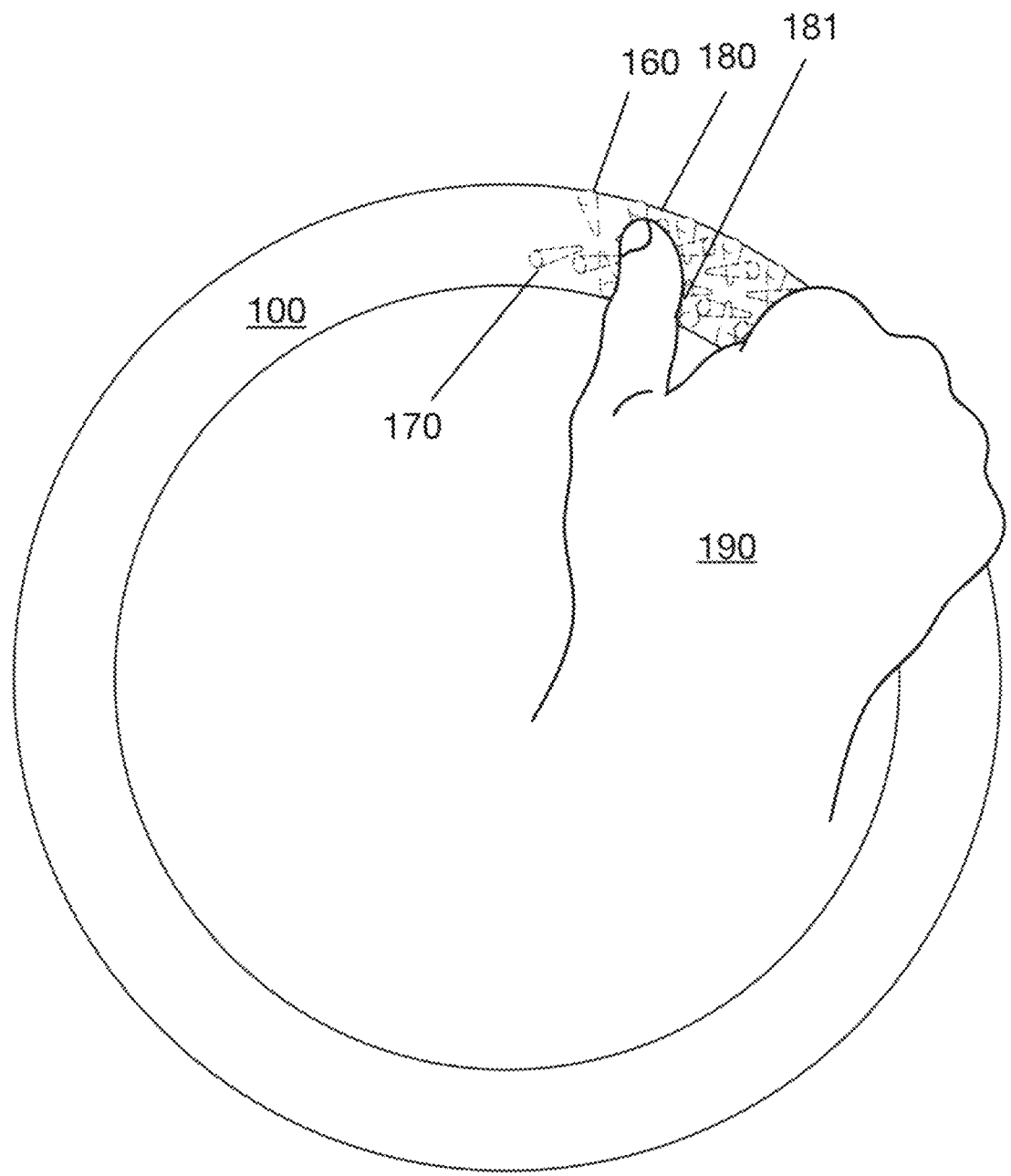

Reference is made to FIGS. 4 and 5, which are simplified illustrations of a thumb swipe gesture detected by a steering wheel, in accordance with an embodiment of the present invention. FIGS. 4 and 5 illustrate a swipe gesture performed by the driver's thumb of hand 190 gripping steering wheel 100. In FIG. 4 the driver's radially extended thumb is detected by inner band 181 of proximity sensors, and in FIG. 5 the driver's thumb is detected by outer band 180 of proximity sensors. This gesture is efficient and comfortable for the driver gripping the wheel, as the driver radially extends her thumb from the palm (FIG. 4) and then adducts the thumb to sweep it upward across the width of the steering wheel (FIG. 5). The reverse gesture—abducting the thumb from the position in FIG. 5 to the position in FIG. 4—is also efficient and comfortable for the driver. Other gestures, such as moving a finger or hand along one of the bands 180 and 181, are also supported by embodiments of the present invention.

Figure 6:
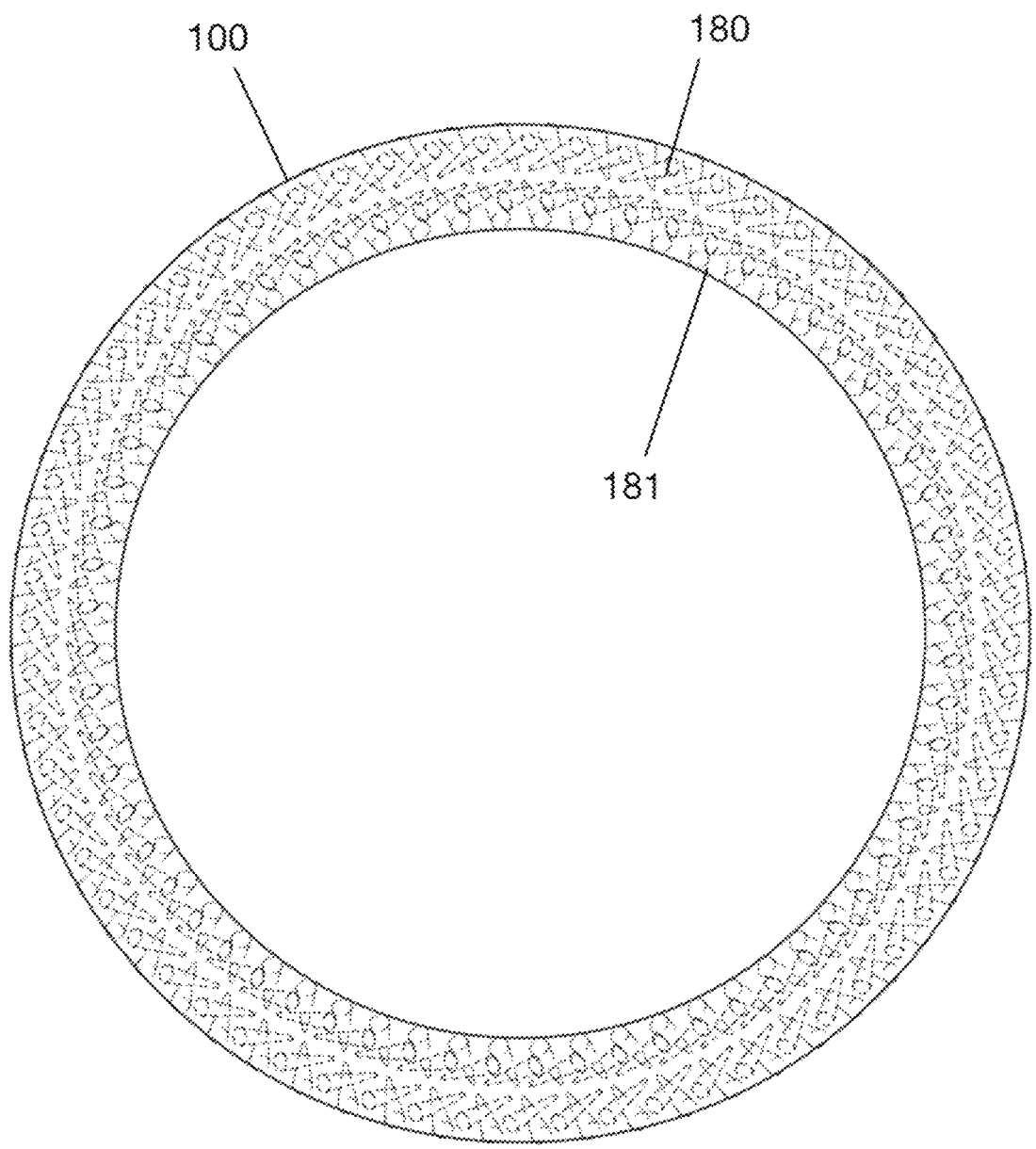
FIG. 6 is a simplified illustration of the light beams and corridors of maximum light detection provided for a gesture-detecting steering wheel, in accordance with an embodiment of the present invention.

Reference is made to FIG. 6, which is a simplified illustration of the light beams and corridors of maximum light detection provided for a gesture-detecting steering wheel, in accordance with an embodiment of the present invention. FIG. 6 shows two complete concentric circles 180, 181 of proximity sensors along the grip of steering wheel 100.

Figure 7:
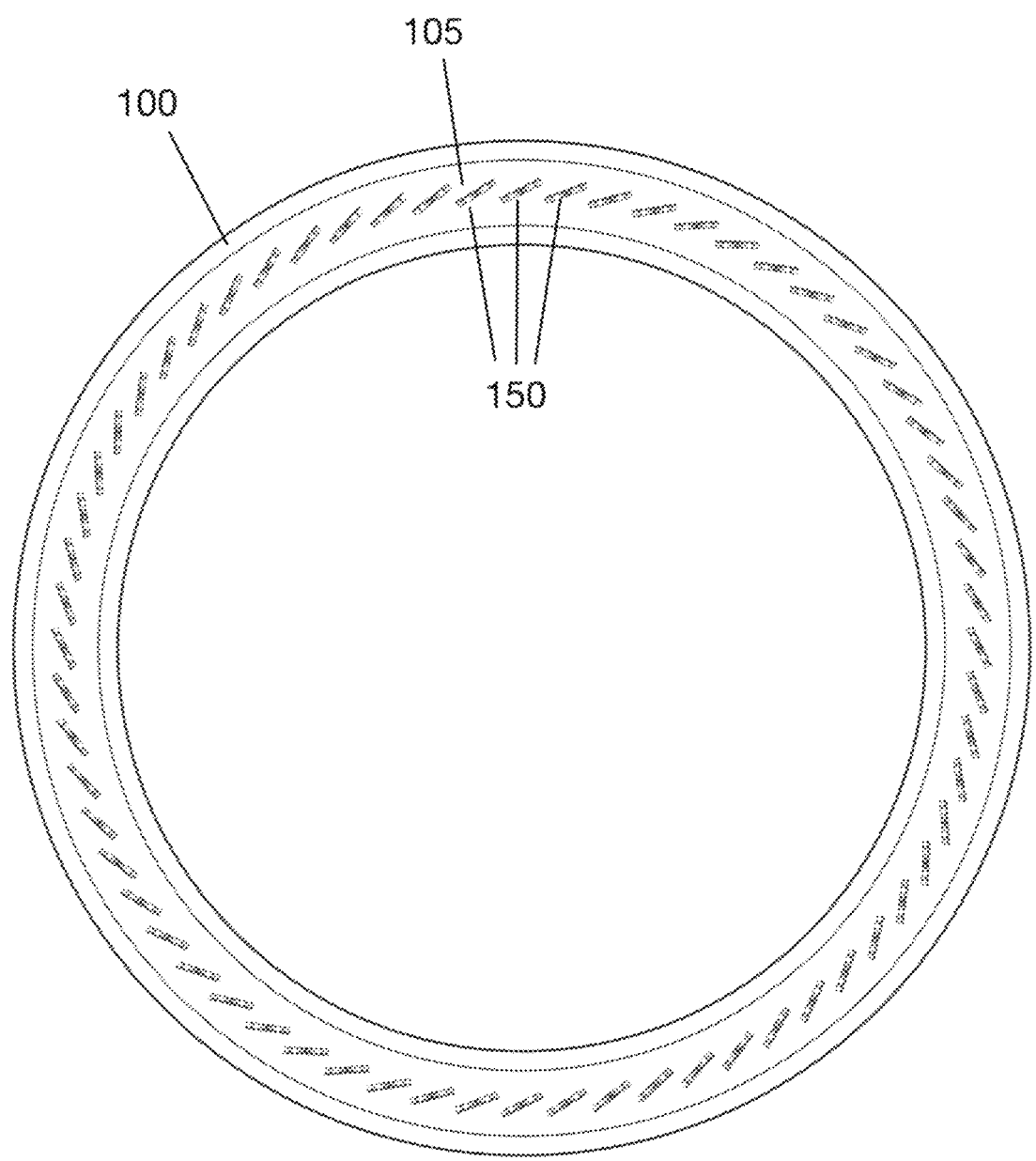
FIG. 7 is a simplified illustration of optoelectronic components mounted on a PCB in a steering wheel, in accordance with an embodiment of the present invention.

Reference is made to FIG. 7, which is a simplified illustration of optoelectronic components mounted on a PCB in a steering wheel, in accordance with an embodiment of the present invention. FIG. 7 shows the steering wheel of FIG. 6 with the upper portion of the steering wheel grip removed to expose PCB 105 and a plurality of optoelectronic components 150 mounted upright on PCB 105; i.e., optoelectronic components 150 are oriented substantially perpendicular to PCB 105 and to the surface of the steering wheel grip facing the driver. Some steering wheel ring members include an inner ring made of a stiff material shaped into a bent or curved cross-section that strengthens the steering wheel ring, as discussed in U.S. Pat. No. 3,714,844, incorporated herein in its entirety by reference, and illustrated therein in FIGS. 13A-13N. In certain embodiments of the invention, optoelectronic components 150 are mounted between the walls formed by the bent or curved inner ring cross-section to protect optoelectronic components 150. Each optoelectronic component 150 includes a PCB, one or more emitters, one or more detectors and a lens that directs light beams 160 and creates viewing angles 170 for the detectors. The upper portion of the steering wheel grip, not shown in FIG. 7, is light-transmissive to enable beams 160 to travel out of steering wheel 100 and to enable reflections of beams 160 to re-enter steering wheel 100 and reach the detectors. When optoelectronic components 150 are mounted between the walls formed by the bent or curved inner ring cross-section, beams 160 pass through the opening in the bent or curved cross-section.

Figure 8:
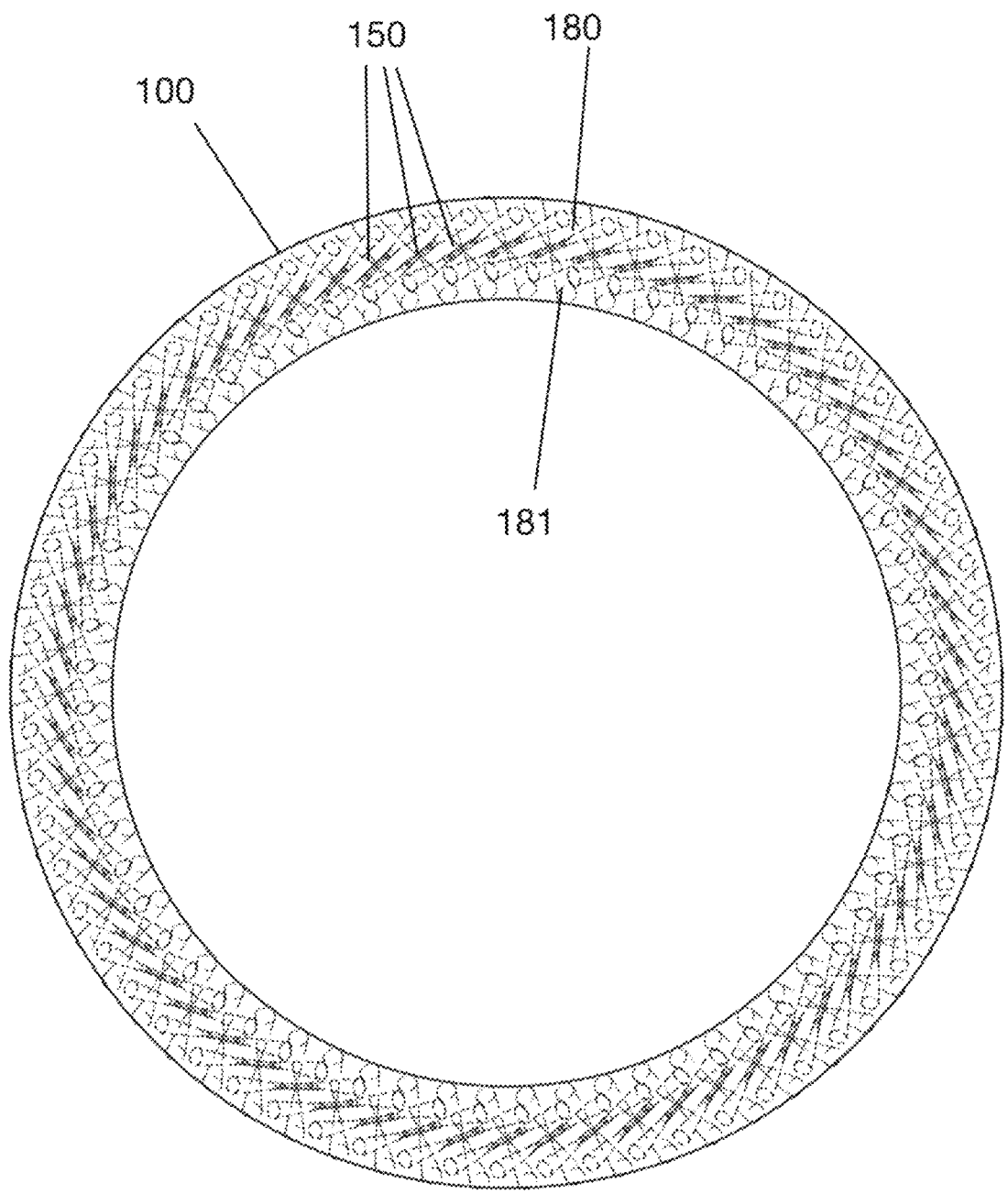
FIG. 8 is the illustration of FIG. 7 with the addition of light beams and corridors of maximum light detection provided for a gesture-detecting steering wheel, in accordance with an embodiment of the present invention.

Reference is made to FIG. 8, which is the illustration of FIG. 7 with the addition of light beams and corridors of maximum light detection provided for a gesture-detecting steering wheel, in accordance with an embodiment of the present invention. FIG. 8 shows the steering wheel of FIG. 7, optoelectronic components 150 and the light beams and viewing angles that enable the proximity sensors to detect objects. FIG. 8 shows the two concentric bands 180 and 181 of proximity sensors by illustrating intersections between emitter beams and viewing angles for all of the optoelectronic components.

Figure 9:
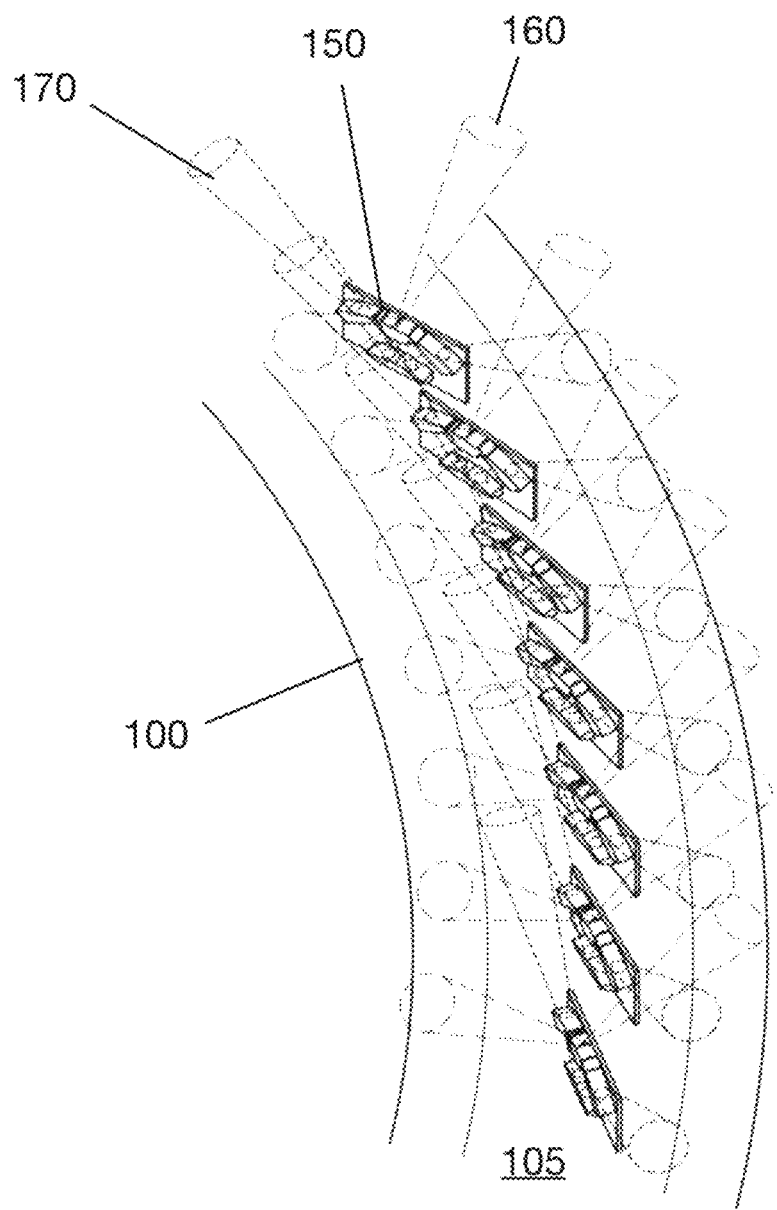
FIGS. 9-11 are simplified illustrations of optoelectronic components mounted in a segment of a steering wheel, in accordance with an embodiment of the present invention.
Figure 10:
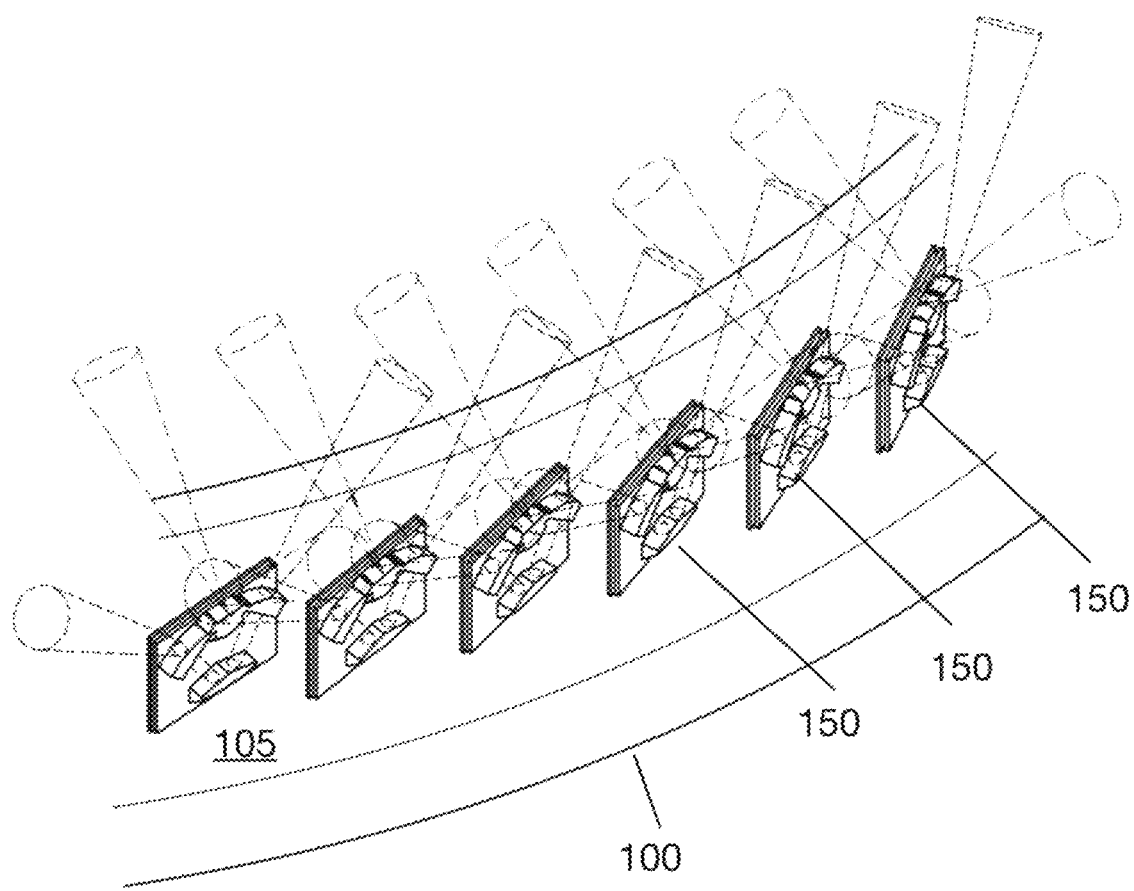
Figure 11:
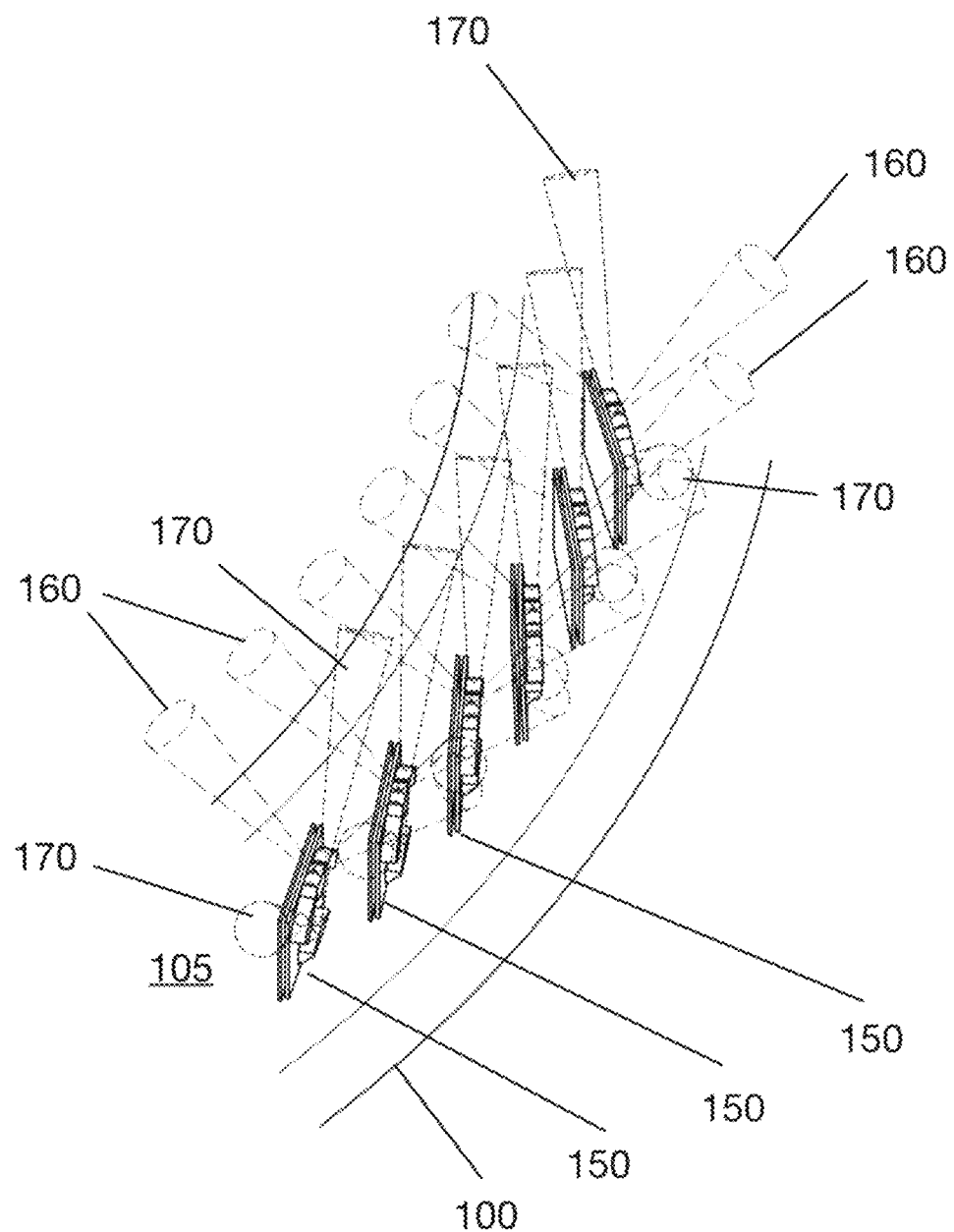

Reference is made to FIGS. 9-11, which are simplified illustrations of optoelectronic components mounted in a segment of a steering wheel, in accordance with an embodiment of the present invention. FIGS. 9-11 show a portion of steering wheel 100 without its upper surface, exposing PCB 105 and six or seven optoelectronic components 150. The emitter beams 160 and detector viewing angles 170 for each optoelectronic component 150 are shown. The intersection between each emitter beam 160 and the viewing angle 170 of a corresponding detector is the location at which an object, reflecting beam 160, is detected. Each optoelectronic component 150 in FIGS. 9-11 has two emitter beams and two detector viewing angles. The emitter beams are projected out of the component at divergent angles, denoted a1 and a2, and the viewing angles are denoted b1 and b2. Projection angles a1 and a2 and viewing angles b1 and b2 are shown in FIG. 13. FIGS. 9-11 also show that the two emitter beams of optoelectronic component n are intersected by the viewing angles of optoelectronic component n−1 and optoelectronic component n+1, respectively. This relationship between neighboring optoelectronic components is further illustrated in FIG. 12.

Figure 12:
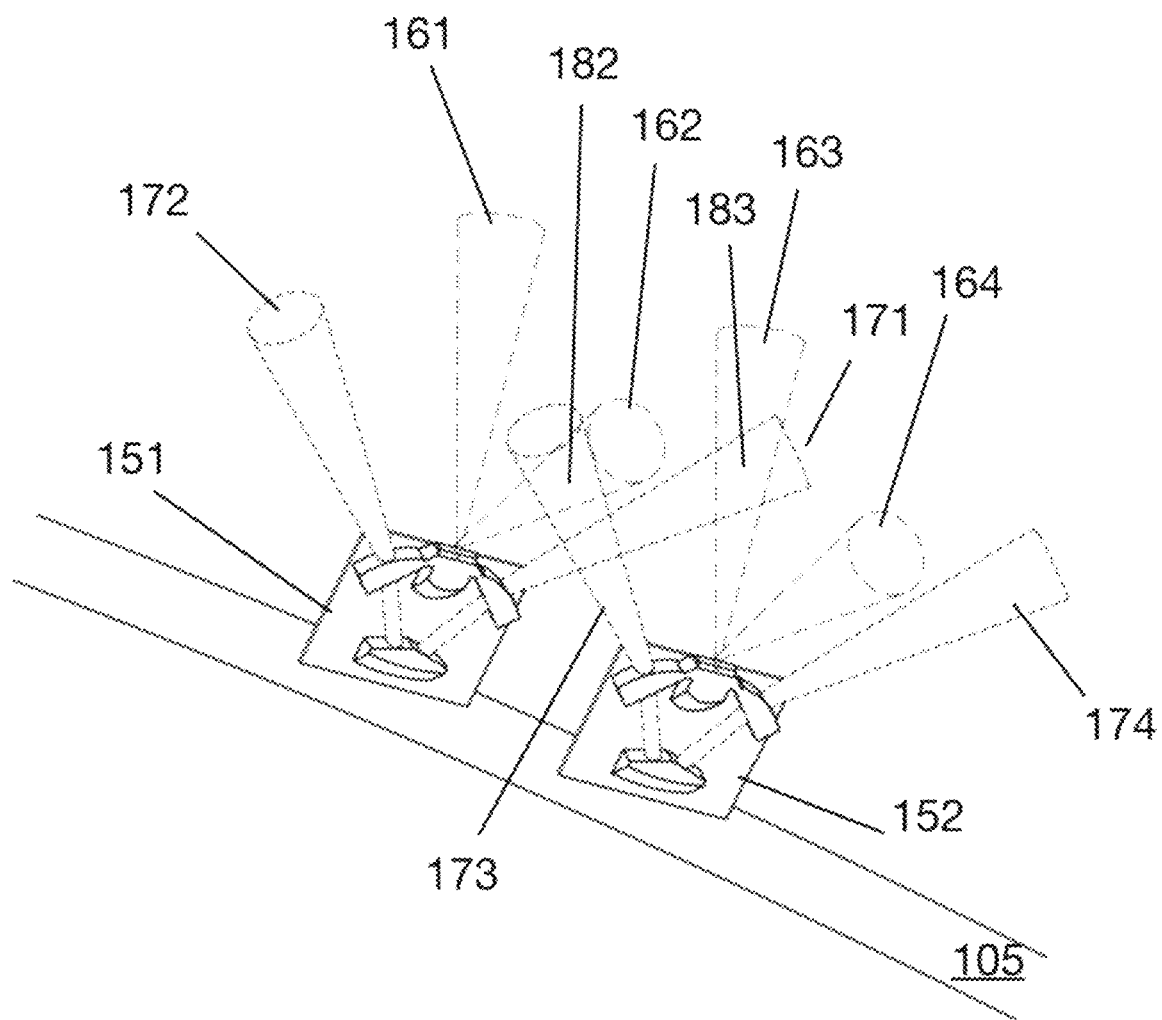
FIG. 12 is a simplified illustration of two optoelectronic components in a steering wheel, in accordance with an embodiment of the present invention.
Figure 13:
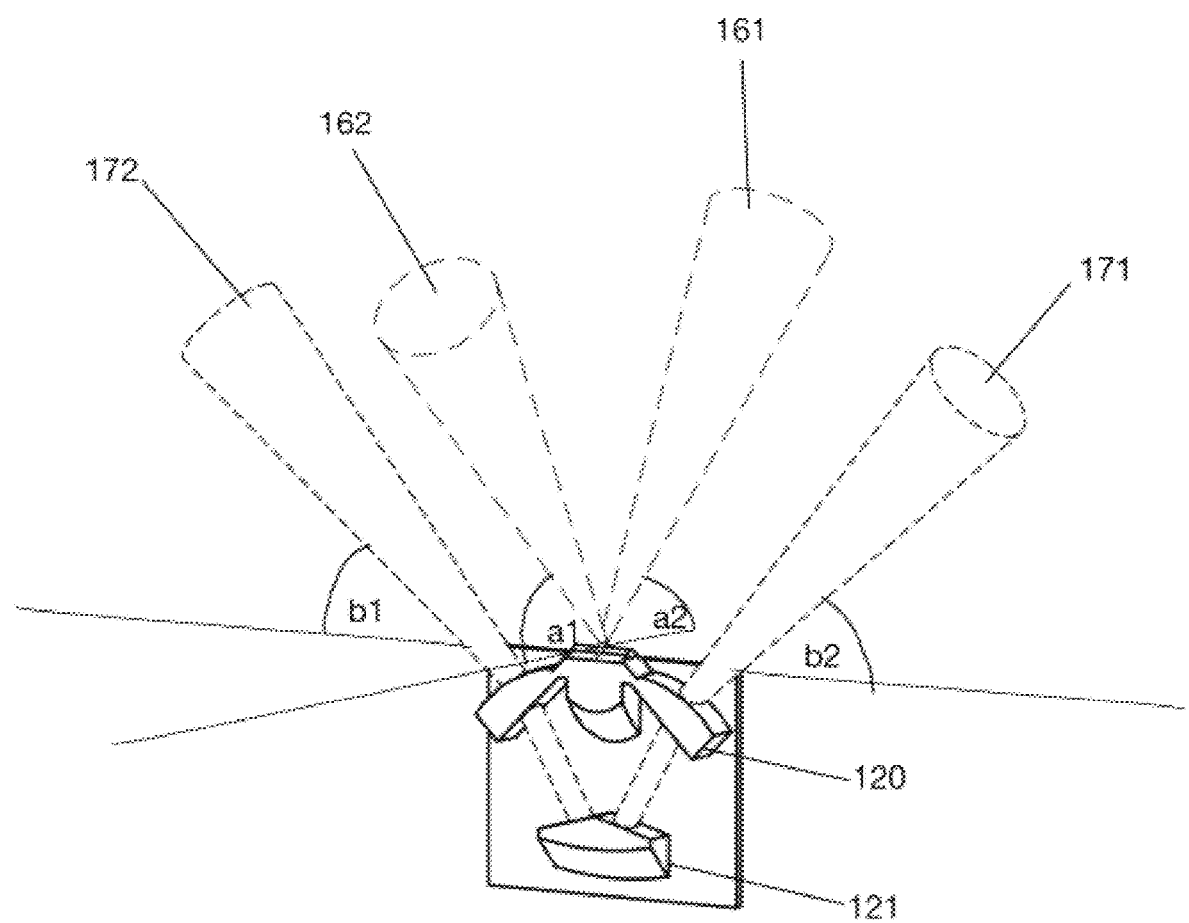
FIG. 13 is a simplified illustration of an optoelectronic component, in accordance with an embodiment of the present invention.

Reference is made to FIG. 12, which is a simplified illustration of two optoelectronic components in a steering wheel, in accordance with an embodiment of the present invention. FIG. 12 shows two, neighboring optoelectronic components 151 and 152 mounted on PCB 105.

Optoelectronic component 151 projects emitter beams 161 and 162 and detects light arriving at viewing angles 171 and 172. Optoelectronic component 152 projects emitter beams 163 and 164 and detects light arriving at viewing angles 173 and 174. A location along an emitter beam that is located along the viewing angle of a detector is referred to as a "hotspot". Reflections of the light beam by an object at this location are maximally detected by the detector. In certain embodiments of the invention, the hotspots are located at, or near, the outer surface of the steering wheel grip facing the driver. In other embodiments of the invention, the hotspots are located in airspace above the outer surface of the steering wheel grip facing the driver. In still other embodiments of the invention, some of the hotspots are nearer to the steering wheel grip than others. Two hotspots 182 and 183 are indicated in FIG. 12. Hotspot 183 is at the intersection of emitter beam 163 and viewing angle 171. Hotspot 182 is at the intersection of emitter beam 162 and viewing angle 173. Hotspot 183 is located along outer band 180 of the proximity sensors in FIGS. 3-6, and hotspot 182 is located along inner band 181 of the proximity sensors in FIGS. 3-6. Thus the concentric bands or arcs of the proximity sensors in FIGS. 3-6 are actually hotspots created by the emitters and detectors of optoelectronic components 150. The two emitter beams emitted by each optoelectronic component define a first plane, and the two viewing angles of that same optoelectronic component define a second plane that intersects the first plane. This is illustrated in FIG. 13.

Reference is made to FIG. 13, which is a simplified illustration of an optoelectronic component, in accordance with an embodiment of the present invention. FIG. 13 illustrates a single optoelectronic component. The two emitter beams 161 and 162, that are projected at angles denoted a1 and a2, respectively, define a first plane and the two viewing angles 171 and 172, denoted b1 and b2, respectively, define a second plane. In some embodiments of the invention these planes are orthogonal; in other embodiments these planes intersect, but not at right angles.

FIG. 13 shows two optical parts 120 and 121 separated by air. A single emitter, e.g., a vertical cavity surface-emitting laser (VCSEL) or a light-emitting diode (LED), is mounted underneath optical part 120 and its light is split into beams 161 and 162. A single photodiode detector is mounted underneath optical part 121. The combination of lenses and air-to-plastic surfaces in optical parts 120 and 121 provides two viewing angles 171 and 172 to this single photodiode detector. In certain embodiments of the invention each light beam is generated by a separate light emitter. In certain other embodiments of the invention a separate detector is provided for each viewing angle. And in still other embodiments of the invention each light beam is generated by a separate light emitter and a separate detector is provided for each viewing angle.

Figure 14:
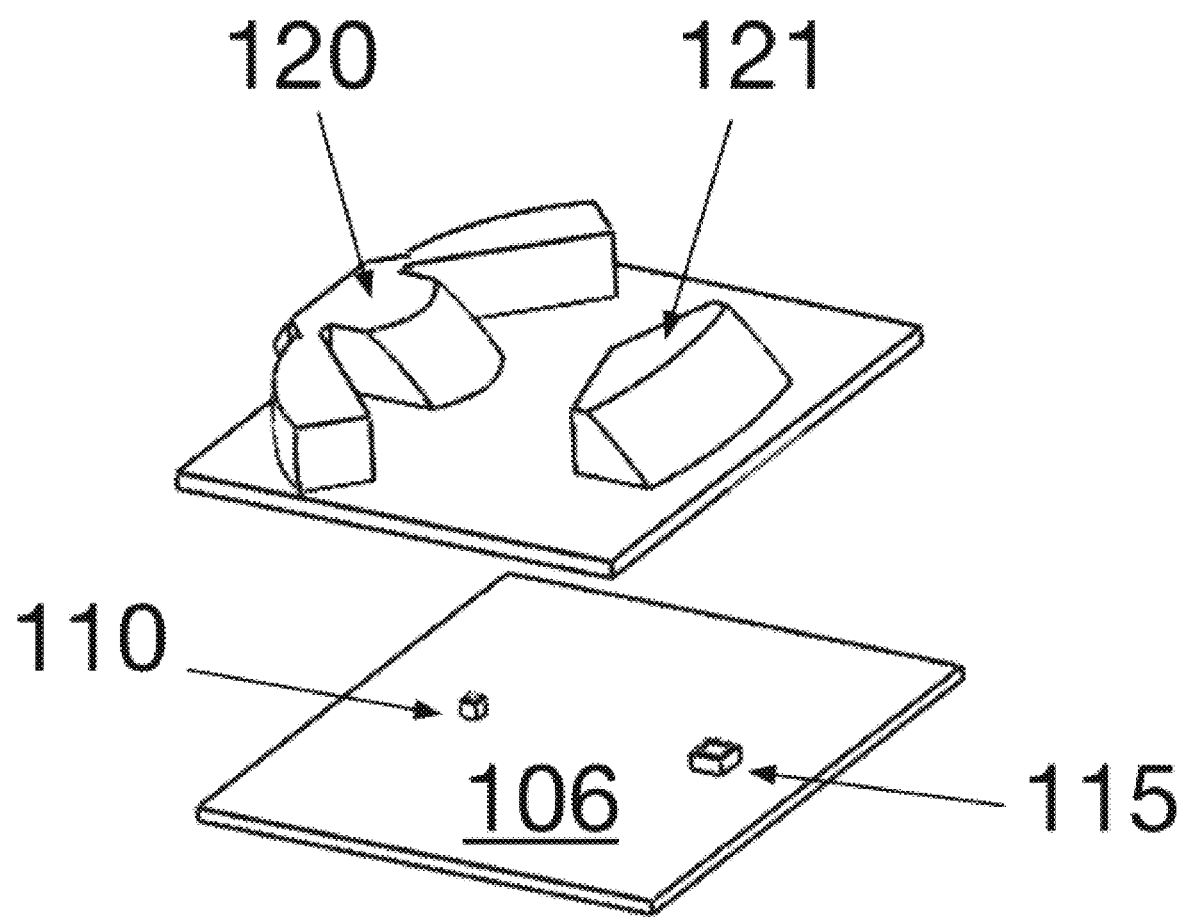
FIG. 14 is an exploded view of the optoelectronic component of FIG. 13, in accordance with an embodiment of the present invention.

Reference is made to FIG. 14, which is an exploded view of the optoelectronic component of FIG. 13, in accordance with an embodiment of the present invention. FIG. 14 shows emitter 110 and photodiode detector 115 mounted on PCB 106, covered by optical parts 120 and 121. In some embodiments, optical parts 120 and 121 are molded as a single part that is mounted on PCB 106.

Referring back to FIGS. 9-11, it can be seen that each viewing angle can be configured to intersect two emitter beams emitted by two respective optoelectronic components. These two hotspots are at different heights above the steering wheel grip, and enable detecting when the driver's hand approaches the steering wheel grip, namely, the further hotspot detects the hand first, and the nearer hotspot detects the hand second. The nearer hotspot is formed by the detector on optoelectronic component n detecting a light beam emitted by optoelectronic component n+1, and the further hotspot is formed by the detector on optoelectronic component n detecting a light beam emitted by optoelectronic component n+2.

Certain proximity sensors provide a large array of light emitters and light detectors mounted on a single PCB. This configuration requires that each emitter and each detector be placed precisely on the PCB so that they are positioned correctly in relation to their respective lenses. However, a long PCB may suffer from significant bending or warping when exposed to heat, causing a misalignment between the lenses and the components. Furthermore, when one lens part is used for more than one component, it may be difficult to position the lens part correctly. In order to overcome these problems, embodiments of the present invention use multiple PCBs, and mount a small number of emitters and detectors on each PCB, e.g., only one or two emitters and only one or two detectors.

Figure 15:
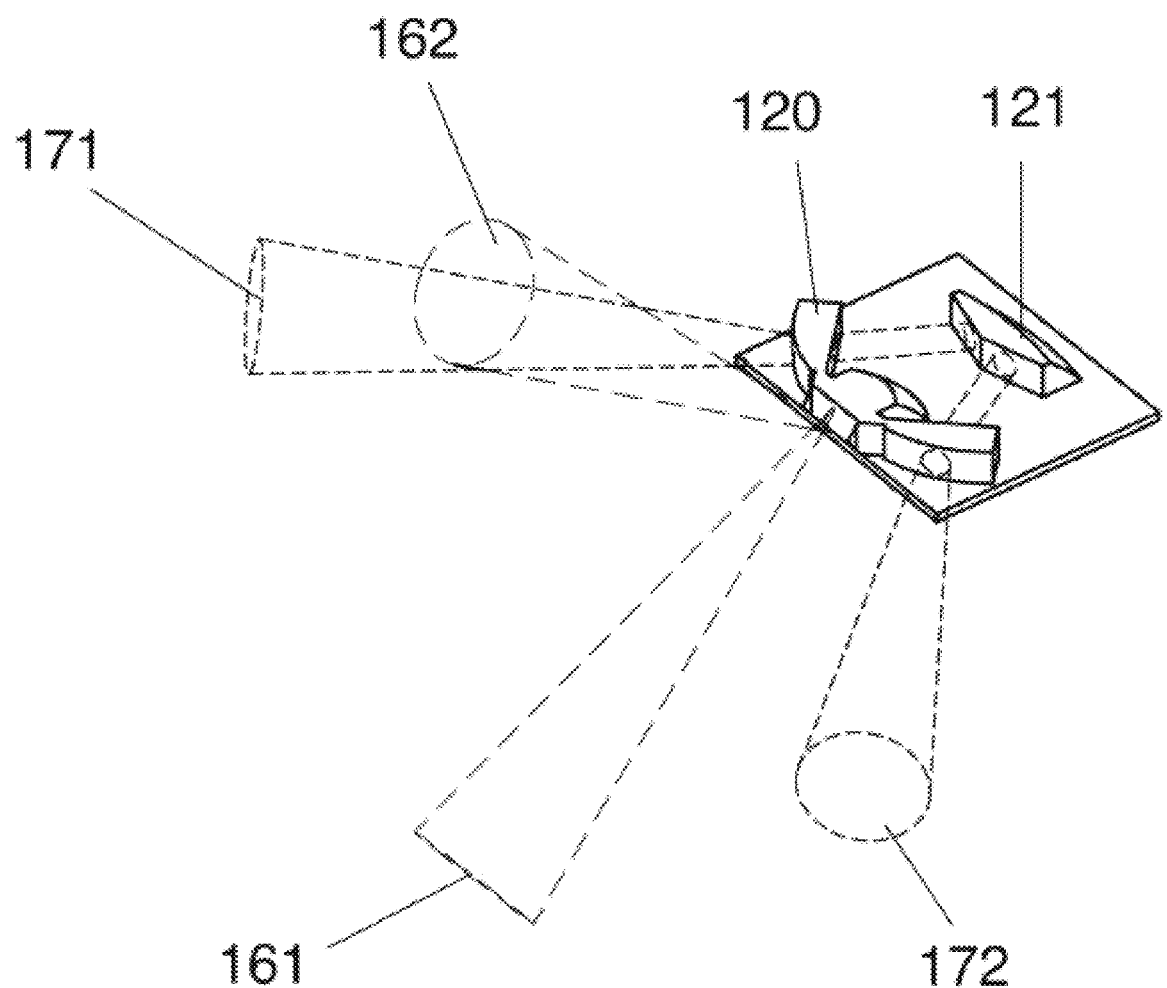
FIG. 15 is a simplified illustration of the optoelectronic component of FIG. 13 viewed from a different perspective, in accordance with an embodiment of the present invention.

Reference is made to FIG. 15, which is a simplified illustration of the optoelectronic component of FIG. 12 viewed from a different perspective, in accordance with an embodiment of the present invention. FIG. 15 is a perspective view from above of the optoelectronic component of FIG. 13. The outer surface (near the viewer) of the central portion of optical part 120 has two inclined surfaces that direct light in the two directions 161 and 162.

Several options are available for connecting the optoelectronic components to each other. One option is to provide one or more rigid, main PCBs 105 along the entire steering wheel grip, and soldering or otherwise connecting each optoelectronic component's PCB 106 to the underlying rigid PCB 105. A second option is to use a rigid-flex PCB, where individual optoelectronic component PCBs 106 are connected by flexible circuit substrates, and no PCB 105 is required. The output signals from the optoelectronic components 150 are typically weak signals and therefore the connector between optoelectronic components may need to be shielded.

Aspects of the present disclosure relate to touch and mid-air gestures used to replace mechanical switches in vehicle overhead consoles for improved appearance, reduced cost, thinner profiles, reduced weight, and easy reconfiguration for different vehicles. The present invention replaces the mechanical buttons in prior art overhead consoles with touch and gesture controls, reducing complexity and part cost. In this description the terms "mid-air" and "in-air" are used interchangeably.

According to the present invention, an improved user interface for vehicle overhead console functions is provided that increases driver interaction while reducing driver distraction. The user interface of the present invention requires less time and attention to operate than prior art overhead consoles, thereby allowing the driver to focus more attention on the road. At the same time, the user interface of the present invention enables more nuanced control of console-operated functions by the driver. Thus, whereas prior art cabin lighting systems offer only rudimentary light controls, the present invention enables more comprehensive cabin mood lighting features while reducing the complexity of using these features.

The present invention combines a reconfigurable graphic display with on-surface gestures and mid-air gestures to operate the overhead console functions. The present invention requires a multi-gesture operation, namely, a touch gesture followed by a mid-air gesture to activate an overhead console function, reducing the possibility of inadvertent activation of functions. Reducing the possibility of inadvertent activation of functions is a motivation for requirements in FMVSS No. 118.

Figure 16:
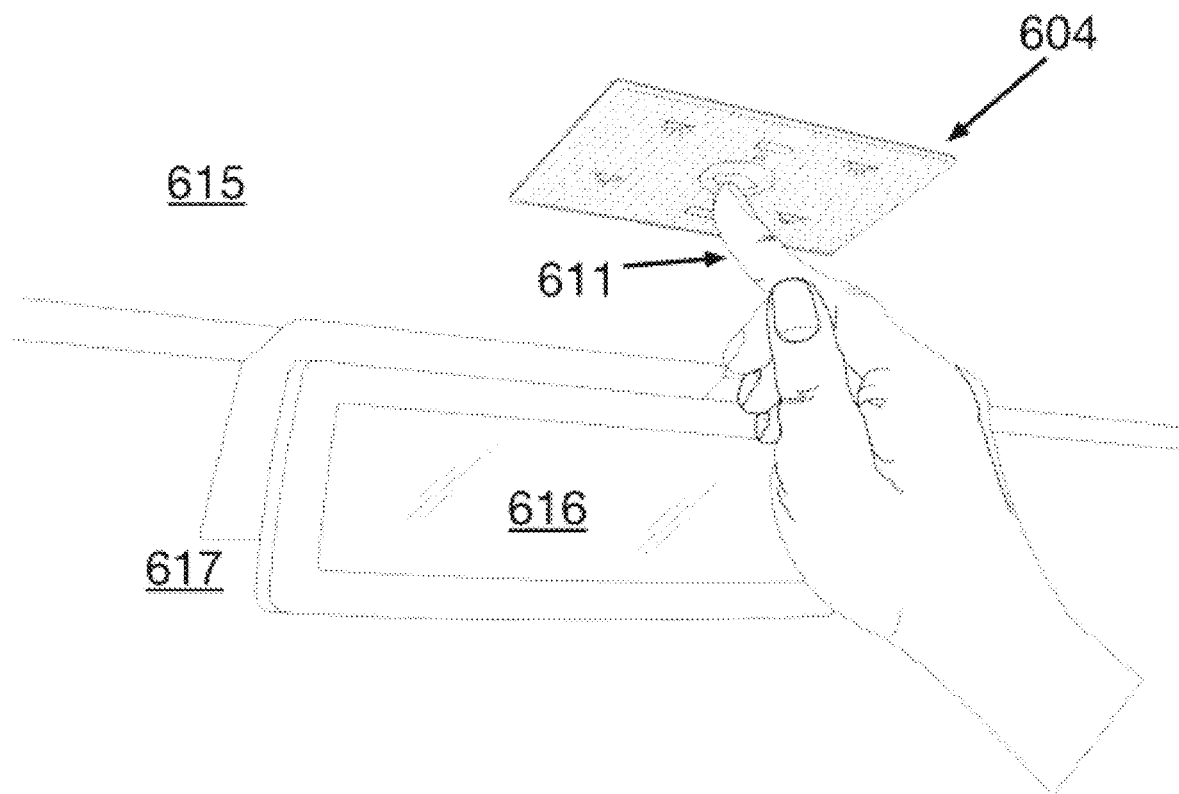
FIG. 16 is a simplified illustration of a touch gesture on a vehicle overhead console touchscreen, in accordance with an embodiment of the present invention.

Reference is made to FIG. 16, which is a simplified illustration of a touch gesture on a vehicle overhead console touchscreen, in accordance with an embodiment of the present invention. FIG. 16 shows a touchscreen 604 mounted on an interior roof 615 of a vehicle to function as an overhead console. FIG. 16 shows front windshield 617 and rearview mirror 616, to illustrate that display 604 is located where vehicle overhead consoles are typically mounted in a vehicle. Finger 611 is shown touching display 604. Display 604 presents a graphical user interface (GUI), e.g., icons for the different functions activated by the overhead console. When the user touches or taps an icon, as illustrated in FIG. 16, that function is selected on the display but not activated. In order to activate the function, the user performs a mid-air gesture in the airspace opposite display 604, e.g., a wave gesture. The direction and extent of the wave gesture determine how the function is activated. E.g., when a lighting function is selected, the forward/backward direction of the wave indicates whether to increase or decrease the lighting, and the length of the wave gesture indicates how much to increase or decrease the lighting. Furthermore, a left/right direction of the wave can be used to select another lighting variable, such as lighting mood or color. In another example, when a roof panel function is selected, the forward/backward direction of the wave indicates whether to open or close the panel, and the length of the wave gesture indicates how much to open or close the panel. Furthermore, a left/right direction of the wave can be used to select another roof panel function, such as pop-up the panel as an air vent.

In certain embodiments of the invention, the touch functionality of display 604 is enabled by an optical proximity sensor as described in U.S. Pat. No. 9,164,625, entitled OPTICAL PROXIMITY SENSORS, and in U.S. Pat. No. 9,921,661, entitled OPTICAL PROXIMITY SENSOR AND ASSOCIATED USER INTERFACE, both of which are incorporated herein by reference in their entirety. This optical proximity sensor creates a detection plane substantially parallel to the surface of display 604.

In certain embodiments of the invention, display 604 is an electronic paper display. In other embodiments of the invention, display 604 is mounted behind a Fiber Optic Faceplate (FOFP) which is a coherent fiber optic plate that precisely transmits an image from its input surface to its output surface. Thus, an image on the display is transmitted by the FOFP to the exposed surface of the plate and appears to the user as if the image is on the exposed surface of the faceplate. This protects the display and provides a rich user experience. In other embodiments of the invention, icons or other representations of functions are printed, engraved or embossed, on material such as leather, wood, glass or plastic mounted in the interior roof of the vehicle cabin, and the sensor detects touches on these icons. In other embodiments of the invention, icons or other representations of functions are printed, engraved or embossed on the interior roof of the vehicle cabin. In some embodiments of the invention, icons are etched into a translucent plastic plate mounted in the roof of the vehicle cabin and light emitters are arranged around the plate whereby when a light emitter is activated a corresponding etched icon reflects the emitter light and is clearly visible. Initially, all icons are thus illuminated, and when an icon is selected by the user only the selected icon is illuminated by a respective light emitter and the remaining emitters are turned off making visibility of the remaining icons less prominent.

Figure 17:
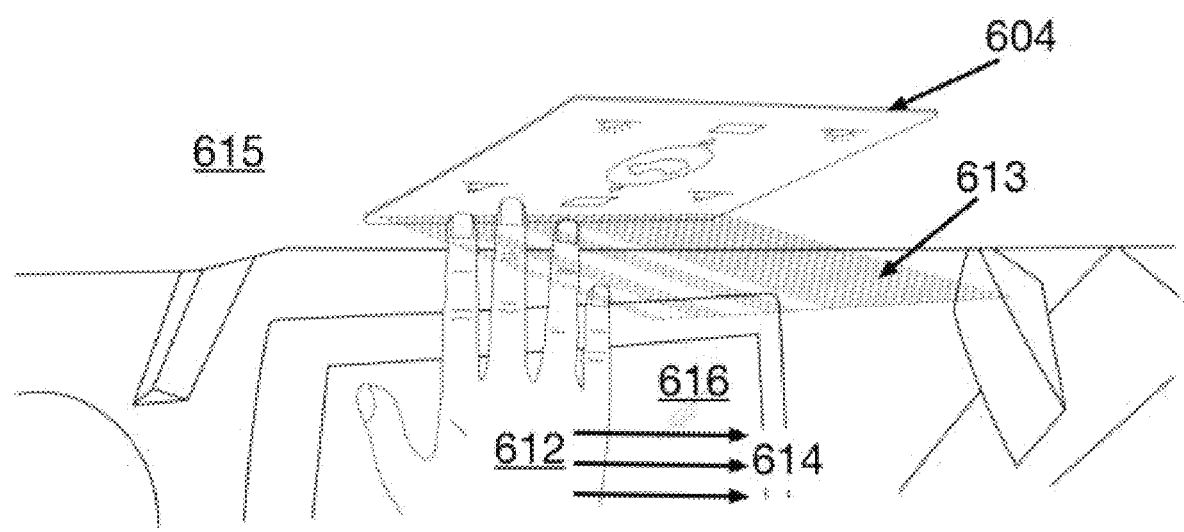
FIG. 17 is a simplified illustration of a hand performing a wave gesture in the airspace opposite the vehicle overhead console touchscreen of FIG. 16, in accordance with an embodiment of the present invention.

Reference is made to FIG. 17, which is a simplified illustration of a hand performing a wave gesture in the airspace opposite the vehicle overhead console touchscreen of FIG. 16, in accordance with an embodiment of the present invention. FIG. 17 shows the second gesture required to activate an overhead console function. FIG. 17 shows fingers 612 performing an in-air wave gesture in the airspace opposite display 604. In certain embodiments of the invention, the sensor used to detect the in-air gesture is also an optical proximity sensor as described in U.S. Pat. Nos. 9,164,625, and 9,921,661, directed away from the surface of display 604. The detection plane of this sensor is indicated in FIG. 17 as detection plane 613. The use of this type of proximity sensor to detect in-air gestures is illustrated, inter alia, in FIG. 37 of U.S. Pat. No. 9,921,661. Furthermore, these proximity sensors detect the difference between a single finger 611 and multiple fingers 612, inter alia, based on the number and pattern of detected reflected light beams. Thus, a user interface according to the present invention further prevents inadvertent activation by requiring a single finger to perform the touch gesture and multiple fingers to perform the wave gesture in order to activate the function.

Figure 18:
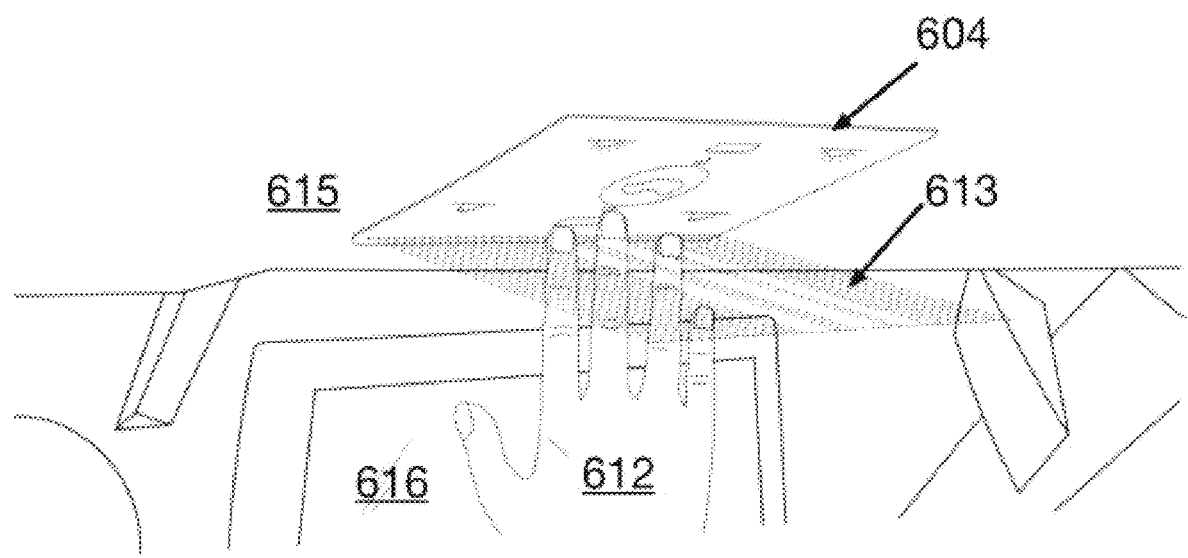
FIGS. 18 and 19 are simplified illustrations of different stages of a hand wave gesture in the airspace opposite the vehicle overhead console touchscreen of FIG. 16, in accordance with an embodiment of the present invention.
Figure 19:
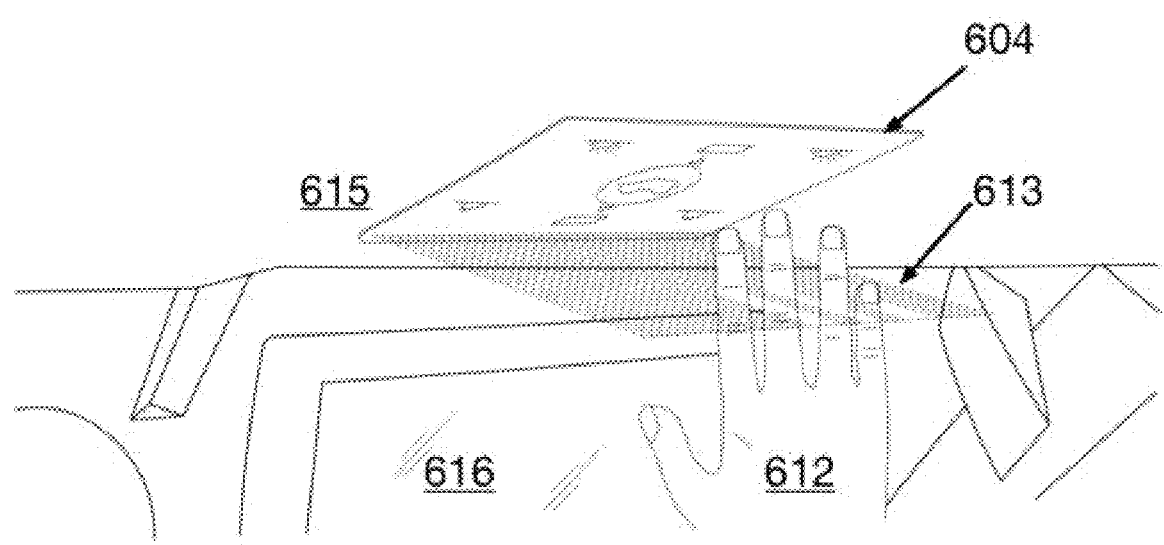

Reference is made to FIGS. 18 and 19, which are simplified illustrations of different stages of a hand wave gesture in the airspace opposite the vehicle overhead console touchscreen of FIG. 16, in accordance with an embodiment of the present invention. FIGS. 18 and 19 show an in-air front-to-back hand wave gesture. In FIG. 18 fingers 612 are opposite the top of display 604, near rearview mirror 616, and in FIG. 19 fingers 612 have moved to the bottom of display 604.

Figure 20:
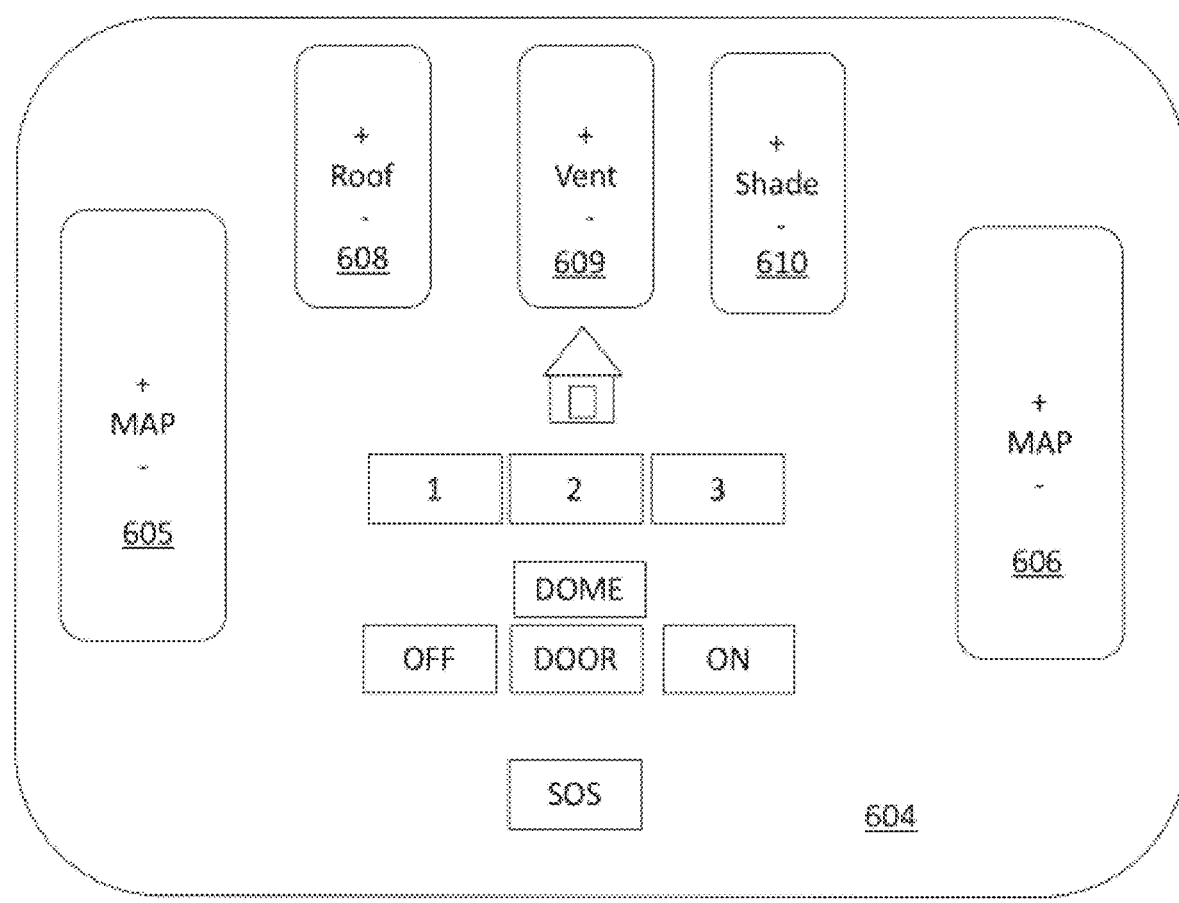
FIGS. 20 and 21 are simplified illustrations of a touchscreen user interface for a vehicle overhead console, in accordance with an embodiment of the present invention.
Figure 21:
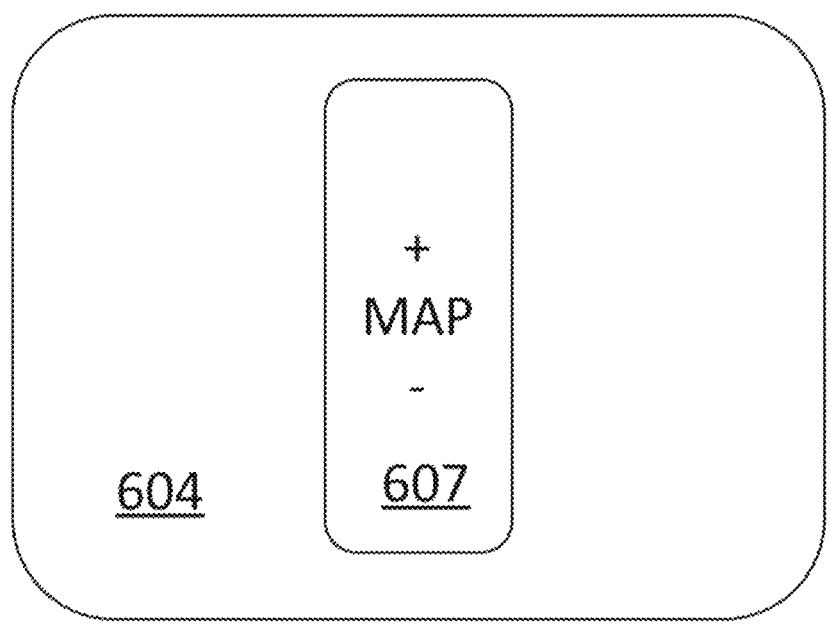

Reference is made to FIGS. 20 and 21, which are simplified illustrations of a touchscreen user interface for a vehicle overhead console, in accordance with an embodiment of the present invention. FIG. 20 shows a user interface for display 604, including icons 605 and 606 indicating driver and passenger map lights, respectively; icon 608 indicating functions for opening and closing the sunroof; icon 609 for popping the roof panel up or down as an air vent; icon 610 indicating functions for opening and closing the moonroof; additional icons marked "OFF," "DOOR" and "ON" controlling behavior of the interior dome light, to never go on, go on when doors are open, and remain on, respectively.

FIG. 21 shows a user interface for display 604, after the user has selected map light icon 605 in FIG. 20. In FIG. 21 the selected icon is enlarged and the non-selected icons are removed. In this state, hand wave gestures will activate the selected map light, e.g., the driver-side map light.

Tables I-XII hereinbelow provide a detailed inventory of a user interface for overhead console features according to the present invention.

Overhead consoles according to the present invention have fewer components than prior art mechanical consoles. Overhead consoles according to the present invention are also thinner and lighter, and have fewer connections, and therefore fewer potential failure points, than prior art mechanical consoles. When optical touch and gesture sensors are used, visible-lighting optics can share components with the near-infrared sensor optics, e.g., optical touch and gesture sensors include controllers for activating near-infrared LEDs used in the sensors, and these controllers can additionally control visible-light LEDs used to illuminate the cabin. Thus, overall cost is reduced and conventional bulbs are replaced with LEDs.

The present invention enables thinner and lighter packages for the overhead console, and enables using a wide range of materials for the console. It also enables blending the design of the overhead console with the vehicle interior and the vehicle theme. The components—the display, touch sensor and mid-air gesture sensor—can be reused in different vehicle themes. The sensors are offered in packages that provide LED and RGB lighting which can replace the light bulbs used in prior art map lights and interior lights, and enable focusing projected cabin lighting with direct and indirect lighting and creating nuanced mood lighting in the cabin.

The system of a touch sensor detecting touch on a surface on which representations of functions are presented and a gesture sensor detecting gestures in the airspace opposite the surface, and a user interface that combines these two gestures to activate a function, is not limited to overhead consoles. The invention can also be realized inter alia in a rearview mirror and in a side door panel.

In the foregoing specification, the invention has been described with reference to specific exemplary embodiments thereof. It will, however, be evident that various modifications and changes may be made to the specific exemplary embodiments without departing from the broader spirit and scope of the invention. In particular, sensors other than optical sensors may be used to implement the user interface, inter alia capacitive sensors disposed along the circumference of the steering wheel and on the overhead console, or cameras that capture images of the steering wheel and the airspace adjacent the overhead console. Accordingly, the specification and drawings are to be regarded in an illustrative rather than a restrictive sense.

TABLE I

Map light ON/OFF

| | |
|---|---|
| Feature | Map light ON/OFF |
| Feature feedback to user | Toggle visible light on/off. |
| Input action | One finger press > 20 ms < 150 ms. |
| Input action location | 1. Dedicated position on surface (on map light).<br>2. Off surface dedicated position (above map light). |
| Impact to driver attention to the road | Intuitive attention directed to light. |
| Search & glance time | Confirmation from light on or off. |
| Result unintended activation | If ON selected inadvertently then power management turns light off after set time. |
| Haptic effect | Confirmation pop. |
| Feedback sound | Click. |
| Feedback light | Not required. |

TABLE II

Map light brightness

| | |
|---|---|
| Feature | Map light brightness |
| Feature feedback to user | Light brightness change. |
| Input action | One finger hold and then move in sensing zone left/right up/down. |
| Input action location | 1. Dedicated position on surface.<br>2. Off surface dedicated position.<br>3. Off surface adjustment after map selected on surface. |
| Impact to driver attention to the road | Intuitive attention directed to light. |
| Search & glance time | Confirmation from light increase or decrease. Haptics could increase feedback but secondary to light changing. |
| Result unintended activation | If dome ON then light dims, if not ON no action. |
| Haptic effect | Confirmation & detent/pulse (change acceleration) with movement. |
| Feedback sound | Tick or changing click. |
| Feedback light | Not required. |

TABLE III

Dome light operation selection

| | |
|---|---|
| Feature feedback to user | Dome light operation selection |
| Input action | ON & OFF positions the light changes but DOOR position not readily apparent. |
| Input action location | A. One finger hold in one of ON/DOOR/OFF positions for > 150 ms.<br>B. Toggle or slide to change selection - One finger in middle position < 150 ms then finger moves direction. |
| Impact to driver attention to the road | A.1. Three dedicated positions on surface.<br>A.2. Three dedicated positions off surface. |
| Search & glance time | A.3. Off surface selection after dome selected on surface.<br>B.1. Three dedicated positions on surface.<br>B.2. Three dedicated positions off surface.<br>B.3. Off surface selection after done selected on surface. |
| Result unintended activation | Search reduced with intuitive location of 3 position selection. |

TABLE III-continued

Dome light operation selection

| | |
|---|---|
| Feature feedback to user | Dome light operation selection |
| Haptic effect | Glance reduced with surface geometry to feedback finger position.<br>Haptic feedback reduces glance time.<br>If selected OFF or DOOR inadvertently then map light activated as desired. |
| Feedback sound | Confirmation and release sweep-peak. |
| Feedback light | Click. |
| Feature feedback to user | Not required. |

TABLE IV

Sunroof open AUTOMATIC

| | |
|---|---|
| Feature | Sunroof open AUTOMATIC |
| Feature feedback to user | Roof moves to open position plus motor sound. |
| Input action | One finger hold in sunroof position and then move in opposite direction of close - left/right or up/down. |
| Input action location | 1. Dedicated protected position on surface.<br>2. Off surface after roof selected on surface. |
| Impact to driver attention to the road | Search reduced with intuitive location and surface geometry. |
| Search & glance time | Glance reduced for OPEN position selection with geometry and haptic feedback. |
| Result unintended activation | FMVSS 118 Safety function for Homologation not activated by 20 mm radius sphere unless auto reverse system |
| Haptic effect | Confirmation & detent/pulse (change acceleration) with movement |
| Feedback sound | Not required |
| Feedback light | Not required |

TABLE V

Sunroof close AUTOMATIC

| | |
|---|---|
| Feature | Sunroof close AUTOMATIC |
| Feature feedback to user | Roof moves to close position plus motor sound. |
| Input action | One finger hold in sunroof position and then move in opposite direction of open - left/right or up/down. |
| Input action location | 1. Dedicated protected position on surface.<br>2. Off surface after Roof selected on surface. |
| Impact to driver attention to the road | Search reduced with intuitive location and surface geometry. |
| Search & glance time | Glance reduced for CLOSE position selection with geometry and haptic feedback. |
| Result unintended activation | FMVSS 118 Safety function for Homologation not activated by 20 mm radius sphere unless auto reverse system. |
| Haptic effect | Confirmation & detent/pulse (change acceleration) with movement. |
| Feedback sound | Not required. |
| Feedback light | Not required. |

TABLE VI

Sunroof vent open AUTOMATIC

| | |
|---|---|
| Feature | Sunroof vent open AUTOMATIC |
| Feature feedback to user | Roof moves to vent position plus motor sound. |
| Input action | One finger hold in sunroof vent position and then move in sensing zone left/right or up/down. |
| Input action location | 1. Dedicated protected position on surface. 2. Off surface after Roof selected on surface. |
| Impact to driver attention to the road | Search reduced with intuitive position close to roof open/close. |
| Search & glance time | Glance reduced for Vent position selection with haptic feedback. |
| Result unintended activation | FMVSS 118 Safety function for Homologation not activated by 20 mm radius sphere unless auto reverse system. |
| Haptic effect | Confirmation & detent/pulse (change acceleration) with movement. |
| Feedback sound | Not required. |
| Feedback light | Not required. |

TABLE VII

Sunroof vent close AUTOMATIC

| | |
|---|---|
| Feature | Sunroof vent close AUTOMATIC |
| Feature feedback to user | Roof moves to close position plus motor sound. |
| Input action | One finger hold in sunroof vent position and move in sensing zone left/right or up/down. |
| Input action location | 1. Dedicated protected position on surface. 2. Off surface after Roof selected on surface. |
| Impact to driver attention to the road | Search reduced with intuitive position close to roof open/close. |
| Search & glance time | Glance reduced for Vent position selection with haptic feedback. |
| Result unintended activation | FMVSS 118 Safety function for Homologation not activated by 20 mm radius sphere unless auto reverse system. |
| Haptic effect | Confirmation & detent/pulse (change acceleration) with movement. |
| Feedback sound | Not required. |
| Feedback light | Not required. |

TABLE VIII

Sunshade open AUTOMATIC

| | |
|---|---|
| Feature | Sunshade open AUTOMATIC |
| Feature feedback to user | Shade moves to open position plus motor sound. |
| Input action | One finger hold in sunshade position and then move in sensing zone left/right or up/down. |
| Input action location | 1. Dedicated position on surface 2. Off surface after Shade selected on surface. |
| Impact to driver attention to the road | |
| Search & glance time | |
| Result unintended activation | Not FMVSS 118. |
| Haptic effect | Confirmation & detent/pulse (change acceleration) with movement. |
| Feedback sound | Not required. |
| Feedback light | Not required. |

TABLE IX

Sunshade close AUTOMATIC

| | |
|---|---|
| Feature | Sunshade close AUTOMATIC |
| Feature feedback to user | Shade moves to close position plus motor sound. |
| Input action | One finger hold in sunshade position and then move in sensing zone left/right or up/down. |
| Input action location | 1. Dedicated position on surface. 2. Off surface after Shade selected on surface |
| Impact to driver attention to the road | |
| Search & glance time | |
| Result unintended activation | Not FMVSS 118. |
| Haptic effect | Confirmation & detent/pulse (change acceleration) with movement. |
| Feedback sound | Not required. |
| Feedback light | Not required. |

TABLE X

Home link 1, 2, 3

| | |
|---|---|
| Feature | Home link 1, 2, 3 |
| Feature feedback to user | No readily apparent action. |
| Input action | One finger hold in 1/2/3 positions for > 150 ms. |
| Input action location | Dedicated position on surface. |
| Impact to driver attention to the road | Search reduced with intuitive location and graphics. |
| Search & glance time | Glanced reduced with haptics feedback of correct selection and function initiation. |
| Result unintended activation | Confirmation required since operation not readily apparent. Each function should have unique feedback haptic/light/sound to confirm correct operation. |
| Haptic effect | Confirmation and release sweep-peak. |
| Feedback sound | Click. |
| Feedback light | Can confirm selection and initiation of function. |

TABLE XI

SOS Safety

| | |
|---|---|
| Feature | SOS safety |
| Feature feedback to user | No readily apparent action. |
| Input action | One finger hold in SOS position for > 150 ms. |
| Input action location | Dedicated protected position on surface. |
| Impact to driver attention to the road | Search reduced with graphics and location. |
| Search & glance time | Glanced reduced with haptic feedback of selection and initiation. |
| Result unintended activation | Safety feature, so protected input with geometry should have unique feedback haptic/light/sound. |
| Haptic effect | Confirmation and release sweep-peak. |
| Feedback sound | |
| Feedback light | Illumination color change or flash. |

TABLE XII

| Feature | Storage bin |
|---|---|
| Feature feedback to user | Open door. |
| Input action | One finger hold in bin open position for > 150 ms. |
| Input action location | Dedicated position on surface. |
| Impact to driver attention to the road | Search reduced with location on door. Glance reduced with haptic confirmation and door starts to open. |
| Search & glance time | |
| Result unintended activation | Operation starts bin open or not with readily apparent feedback. |
| Haptic effect | Confirmation and release sweep-peak. |
| Feedback sound | Click. |
| Feedback light | Not required. |

What is claimed is:

1. A steering wheel comprising a series of optoelectronic components mounted in the steering wheel grip, each specific optoelectronic component comprising:
   a PCB;
   a light projector, comprising:
      at least one light pulse emitter mounted on said PCB; and
      at least one first lens oriented relative to said at least one light pulse emitter in such a manner that said at least one light pulse emitter projects light through the at least one first lens out of said steering wheel grip at two different angles relative to the plane of the steering wheel grip, denoted a1 and a2;
   a light sensor, comprising at least one light detector mounted on said PCB, the light sensor detecting reflections of the light projected by the light projectors of the optoelectronic components that neighbor the specific optoelectronic component on two opposite sides thereof, the light being reflected by an object above the steering wheel grip;
   at least one second lens oriented relative to said light sensor in such a manner that said light sensor receives maximum intensity when light enters the at least one second lens at either of two particular angles, specifically, said light sensor receives maximum intensity when the light reflected by the object enters the at least one second lens at a particular angle b1 relative to the plane of the steering wheel grip, and said light sensor also receives maximum intensity when light reflected by the object enters the at least one second lens at a particular angle b2 relative to the plane of the steering wheel grip, b2 being different than b1, wherein reflections of light projected at angle a1 by the light projector of the optoelectronic component neighboring the specific optoelectronic component on one side enter the at least one second lens at angle b1, and reflections of light projected at angle a2 by the light projector of the optoelectronic component neighboring the specific optoelectronic component on the side opposite the one side enter the at least one second lens at angle b2.

2. The steering wheel of claim 1, wherein reflections of light projected at angle a1 by two optoelectronic components positioned on one side of the specific optoelectronic component enter the lens at angle b1.

3. The steering wheel of claim 1, wherein said at least one first lens comprises a beam splitter that splits light from the at least one light pulse emitter into light projected out of the steering wheel grip at angles a1 and a2.

4. The steering wheel of claim 1, wherein said light projector comprises a first light pulse emitter that projects light out of the steering wheel grip at angle a1, and a second light pulse emitter that projects light out of the steering wheel grip at angle a2.

5. The steering wheel of claim 1, wherein each of the at least one light pulse detector receives maximum intensity when the light reflected by the object enters said at least one second lens at angle b1, and also receives maximum intensity when light reflected by the object enters said at least one second lens at angle b2.

6. The steering wheel of claim 1, wherein said light sensor comprises a first light detector that receives maximum intensity when the light reflected by the object enters said at least one second lens at angle b1, and a second light detector that receives maximum intensity when light reflected by the object enters said at least one second lens at angle b2.

7. The steering wheel of claim 1, further comprising a processor, connected to said optoelectronic components, configured to identify a swipe gesture by the object in a first direction across the steering wheel grip in response to a specific optoelectronic component detecting maximum intensity of reflections of the object at one of angles b1 and b2, followed by the specific optoelectronic component detecting maximum intensity of reflections of the object at the other of angles b1 and b2.

8. The steering wheel of claim 1, further comprising a processor, connected to said optoelectronic components, configured to identify a swipe gesture by the object in a first direction across the steering wheel grip in response to a first specific optoelectronic component detecting maximum intensity of reflections of the object at one of angles b1 and b2, followed by a second optoelectronic component, neighboring the first optoelectronic component, detecting maximum intensity of reflections of the object at the other of angles b1 and b2.

9. The steering wheel of claim 8, wherein said processor is further configured to identify a swipe gesture by the object in a second direction across the steering wheel grip in response to the first specific optoelectronic component detecting maximum intensity of reflections of the object at one of angles b1 and b2, followed by the second optoelectronic component detecting maximum intensity of reflections of the object at the same one of angles b1 and b2.

10. The steering wheel of claim 1, further comprising a processor, connected to said optoelectronic components, configured to identify an approach gesture by the object toward the steering wheel grip in response to a specific optoelectronic component detecting maximum intensity of reflections of light projected by the light projector of a first neighboring optoelectronic component at one of angles b1 and b2, followed by detecting maximum intensity of reflections of light projected by the light projector of a second neighboring optoelectronic component at the same one of angles b1 and b2, wherein the second neighboring optoelectronic component is nearer to the specific optoelectronic component than is the first neighboring optoelectronic component.

11. The steering wheel of claim 1, wherein said PCB is oriented substantially perpendicular to the surface of the steering wheel grip facing the driver.

12. The steering wheel of claim 1, wherein reflected light directed into said at least one second lens at angles b1 and b2 is respectively perpendicular to light directed out of said at least one first lens at angles a1 and a2.

13. A method for detecting driver input, comprising:
providing a series of optoelectronic components in a steering wheel grip, each specific optoelectronic component including a light emitter and a light detector;
orienting a lens within each specific optoelectronic component such that the light emitter projects light beams through the lens in two emission directions out of the steering wheel grip, at angles a1 and a2 relative to the plane of the steering wheel grip, and the specific optoelectronic component light detector detects maximum intensity of reflections of the light projected by optoelectronic components that neighbor the specific optoelectronic component when the reflected light enters the lens at angles b1 and b2, the light being reflected by an object above the steering wheel grip; and
mapping driver input to locations along the steering wheel grip that correspond to detections of the reflections.

14. The method of claim 13, further comprising identifying an approach gesture by the object in response to detecting reflections of light projected by a distant neighboring optoelectronic component followed by detecting reflections of light projected by a near neighboring optoelectronic component.

15. The method of claim 13, further comprising identifying a radial swipe gesture by the object in a first direction across the steering wheel grip in response to detecting reflections of the object entering the lens at one of angles b1 and b2, followed by detecting reflections of the object entering the lens at the other of angles b1 and b2.

16. The method of claim 15, further comprising identifying a swipe gesture by the object in a second direction across the steering wheel grip in response to a first optoelectronic component detecting reflections of the object entering the lens at one of angles b1 and b2, followed by a second optoelectronic component, neighboring the first optoelectronic component, detecting reflections of the object entering the lens at the same one of angles b1 and b2.

* * * * *